(12) United States Patent
Anderson et al.

(10) Patent No.: US 12,221,202 B2
(45) Date of Patent: *Feb. 11, 2025

(54) ALTITUDE CONTROL SYSTEM

(71) Applicant: Aerostar International, LLC, Columbia, MD (US)

(72) Inventors: Kevin Anderson, Sunnyvale, CA (US); Jonathan Nutzmann, Redwood City, CA (US); John Cromie, Menlo Park, CA (US); Nathan Winder, San Jose, CA (US)

(73) Assignee: Aerostar International, LLC, Columbia, MD (US)

( * ) Notice: Subject to any disclaimer, the term of this patent is extended or adjusted under 35 U.S.C. 154(b) by 25 days.

This patent is subject to a terminal disclaimer.

(21) Appl. No.: 18/197,408

(22) Filed: May 15, 2023

(65) Prior Publication Data

US 2023/0339591 A1  Oct. 26, 2023

Related U.S. Application Data

(63) Continuation of application No. 16/709,219, filed on Dec. 10, 2019, now Pat. No. 11,685,501, which is a
(Continued)

(51) Int. Cl.
*B64B 1/62* (2006.01)
*B64B 1/40* (2006.01)
(Continued)

(52) U.S. Cl.
CPC .................. *B64B 1/62* (2013.01); *B64B 1/40* (2013.01); *B64B 1/64* (2013.01); *B64C 39/024* (2013.01);
(Continued)

(58) Field of Classification Search
CPC .... B64B 1/40; B64B 1/62; B64B 1/64; B64C 2201/02; B64C 2201/042; G05D 1/042
See application file for complete search history.

(56) References Cited

U.S. PATENT DOCUMENTS 4,500,066 A * 2/1985 Trassl .................. F16K 31/124
251/30.01
4,655,100 A   4/1987 Frederick
(Continued)

FOREIGN PATENT DOCUMENTS

| KR | 20160024328 | 3/2016 |
| WO | WO2019/246087 | 12/2019 |
| WO | WO2019245963 | 12/2019 |

*Primary Examiner* — Tye William Abell
(74) *Attorney, Agent, or Firm* — Kim and Lahey Law Firm, LLC; Douglas W. Kim

(57) ABSTRACT

A system for an unmanned aerial vehicle can include an altitude control system 320, which further includes a compressor assembly 400, a valve assembly 500, and an electronics control assembly 600. The compressor assembly may include a compressor housing 410 that includes a compressor inlet 402, an outlet 202, and a cavity 414 extending therethrough and joining the inlet to the outlet. A diffuser 408 may be coupled to the compressor housing. A motor housing 407 may be disposed within the central cavity at the inlet of the compressor housing, and a compressor motor 406 may be disposed within the motor housing. An impeller 412 disposed within the compressor housing may be coupled to a driveshaft 444 for rotation therewith. The valve assembly may be coupled to an opening 416 of the compressor inlet. The valve head 502 may be configured to move into and away from the inlet opening so as to change a size of the circumferential area of the inlet opening.

19 Claims, 17 Drawing Sheets

Related U.S. Application Data continuation of application No. PCT/US2019/037717, filed on Jun. 18, 2019, which is a continuation-in-part of application No. 16/012,416, filed on Jun. 19, 2018, now Pat. No. 11,857,795.

(60) Provisional application No. 62/782,137, filed on Dec. 19, 2018.

(51) Int. Cl.
  *B64B 1/64* (2006.01)
  *B64C 39/02* (2023.01)
  *G05D 1/00* (2006.01)
  *B64U 10/30* (2023.01)
  *B64U 50/19* (2023.01)

(52) U.S. Cl.
  CPC ............ *G05D 1/042* (2013.01); *B64U 10/30* (2023.01); *B64U 50/19* (2023.01)

(56) References Cited

U.S. PATENT DOCUMENTS

| | | | |
|---|---|---|---|
| 4,690,120 A | 9/1987 | Egle | |
| 5,333,817 A * | 8/1994 | Kalisz | B64B 1/60 244/128 |
| 8,814,084 B2 | 8/2014 | Shenhar | |
| 8,998,128 B2 | 4/2015 | Ratner | |
| 9,174,720 B1 * | 11/2015 | Ratner | B64B 1/64 |
| 9,534,504 B1 * | 1/2017 | Gartner | F01D 5/04 |
| 11,260,950 B2 | 3/2022 | Anderson | |
| 2003/0116204 A1 * | 6/2003 | Volovets | F16K 3/246 137/625.3 |
| 2008/0196770 A1 * | 8/2008 | Ruckel | B62D 25/24 137/519 |
| 2014/0353424 A1 * | 12/2014 | Ratner | B64B 1/64 244/128 |
| 2015/0336653 A1 * | 11/2015 | Anderson | B64B 1/62 417/423.1 |
| 2019/0382094 A1 * | 12/2019 | Anderson | F16K 31/042 |
| 2020/0115024 A1 | 4/2020 | Anderson | |

\* cited by examiner

ALTITUDE CONTROL SYSTEM

CROSS-REFERENCES TO RELATED APPLICATIONS

The present application is a continuation of U.S. application Ser. No. 16/709,219, filed Dec. 10, 2019, which application is a continuation of International Application No. PCT/US2019/037717, filed Jun. 18, 2019, which application is a continuation in part of U.S. application Ser. No. 16/012,146 filed on Jun. 19, 2018, the disclosures of which are hereby incorporated herein by reference. International Application No. PCT/US2019/037717, filed Jun. 18, 2019, also claims the benefit of the filing date of U.S. Provisional Application No. 62/782,137 filed on Dec. 19, 2018, the disclosure of which is hereby incorporated herein by reference. The present application also claims the benefit of the filing date of U.S. Provisional Application No. 62/782,137 filed on Dec. 19, 2018.

BACKGROUND

Unmanned aerial vehicles, such as balloons, may operate at substantial altitudes. Such vehicles may operate within the Earth's stratosphere, having favorably low wind speeds at an altitude between 18 and 25 km (11-15 mi). Wind speed and wind direction vary at certain altitudes, allowing unmanned vehicles to rely on the wind speed and wind direction alone for navigation, without the need for additional propulsion means. Unmanned vehicles must therefore increase or decrease their altitude to change course or to increase speed.

BRIEF SUMMARY

Aspects of the present disclosure are advantageous for high altitude balloon systems. For instance, one aspect of the disclosure provides a system that includes an altitude control system for an unmanned aerial vehicle. The altitude control system further includes a compressor assembly. The compressor assembly includes a compressor housing, a diffuser coupled to the compressor housing, a motor and motor housing and an impeller. The compressor housing can include an inlet, an entrance to the inlet, an outlet, and a central cavity extending therethrough and joining the inlet to the outlet. The motor housing may be disposed within the central cavity within the inlet of the compressor housing. The motor can be disposed within the motor housing. The impeller may be disposed at an outlet of the compressor housing, with the impeller coupled to a driveshaft for rotation therewith. The impeller may overlie the motor housing such that the housing is positioned between the impeller and the entrance to the inlet.

In one example, an interior surface of the compressor housing may extend around the central cavity. The motor housing may be spaced away from the interior surface, such that air may flow around the motor housing to dissipate heat generated by the motor.

In another example, the compressor housing can include a first compressor housing that has a first cavity, a second compressor housing that includes a second cavity aligned with the first cavity. The central cavity may be comprised of the first and second central cavities. In an alternative example, the compressor housing may be monolithic housing.

In yet another example, the diffuser can include a first lower portion extending from the outlet of the compressor housing and a second upper portion coupled to the compressor housing. The first lower portion and the second upper portion may be spaced apart from one another so as to form a lateral opening therebetween.

In another example of this aspect, the lateral opening may be connected to the central cavity so as to allow air to pass through both the central cavity and the lateral opening.

In another example, the compressor assembly can include a mounting structure configured to couple the motor housing to the inlet of the compressor housing. The mounting structure can be thermally coupled with the motor to dissipate heat generate by the motor.

In another example of this aspect, a compressor assembly can further include a radial cavity that extends from the central cavity in a direction radial to the central cavity.

In another example, the system further includes an outer envelope that can be configured to retain a lift gas therein and an inner envelope may be disposed within the outer envelope. The inner envelope can be configured to retain ballast gas therein and the compressor assembly may regulate an amount of air within the inner envelope. Alternatively, the outer envelope may be configured to retail a ballast gas therein, and an inner envelope disposed within the outer envelope may be configured to retain a lift gas therein. The compressor assembly regulates an amount of air within the outer envelope.

In another example, the compressor housing may be formed of at least one brass or stainless steel. The compressor housing may additionally be coated with an electrically conductive conversion coating to inhibit sparking.

In still another example of this aspect, the motor housing can define a bore configured to receive the driveshaft.

In another example, the system can further include an electronic control system that is configured to control the altitude control system. The electronic control system can control an amount of air the compressor assembly sends to the inner envelope, which is configured to retain ballast gas therein.

In yet another example, the system can further include a valve assembly that is coupled to the inlet. The valve assembly may be configured to regulate an amount of air entering into the entrance of the inlet. A valve head can be sized to fit within and fully occupy an area of the entrance. The valve head may be configured to move between a first fully extended position within the entrance and a second retracted position away from the inlet opening.

In another example of this aspect, when the valve head is in the first fully extended position, the valve head can be configured to occupy an entire area of the entrance and thereby prohibit a free flow of contents into and out of the inlet.

According to another aspect of the disclosure, a system includes an altitude control system for an unmanned aerial vehicle that further includes a compressor assembly and an envelope configured to retain a ballast gas therein. The compressor assembly includes a compressor housing, a rotating shaft assembly, an axially movable bearing carrier, a motor, a motor and a biasing element. The compressor housing may be comprised of a first material having a first coefficient of thermal expansion ("CTE"). The rotating shaft assembly may be coupled to the compressor housing. The rotating shaft assembly may further include a driveshaft comprised of a second material having a second CTE and a bearing assembly coupled to the driveshaft. The bearing assembly can further include an interior race extending around the driveshaft and a distal race extending around and spaced apart from the interior ring. The axially movable bearing carrier may house the bearing assembly. The bearing carrier can include a first upper portion, a second lower portion, and an intermediate projection therebetween, as well as a motor and a biasing element. The motor can be coupled to the rotating shaft assembly and the biasing element may be coupled to the bearing carrier. The rotating shaft assembly can be configured to bias the bearing carrier toward the bearing assembly so as to preload the bearing assembly. The compressor assembly may be configured to regulate an amount of air within the envelope. The first CTE and the second CTE can be different such that the first material is configured to expand at a rate that is different than the second material as ambient temperature changes.

In one example, the biasing element may be configured to bias the bearing carrier and the bearing carrier may be configured to move the distal ring of the bearing assembly in an axial direction.

In another example, a motor housing may house the rotating shaft assembly, spring, and motor.

In still another example, the bearing assembly may be positioned within the first upper portion and the bearing assembly may overlie a top surface of the intermediate projection. The biasing element can be positioned in the second lower portion of the bearing carrier, such that the biasing element is arranged to apply a force to a bottom surface of the intermediate projection opposite the top surface.

In yet another example, the biasing element can be a spring and may be selected from a group consisting of a helical spring, a wave spring, and a conical spring washer.

In still another example, the bearing assembly can further include a plurality of ball bearings positioned between the interior and distal races.

In another example, an electronic control system can be configured to control the altitude control system. The electronic control system can determine the amount of air the compressor assembly provides to the envelope.

In another example, the compressor assembly can further include an inlet that extends through the compressor assembly. The system can further comprise a valve assembly that is coupled to the inlet. The valve assembly may be configured to regulate the amount of air entering into the inlet. The valve assembly can further include a valve head sized to fit within and fully occupy an area of an entrance to the inlet. The valve head can be configured to move between a first fully extended position within the entrance and a second retracted position away from the inlet opening. When the valve head is in the first fully extended position, the valve head can be configured to occupy an entire area of the entrance, thereby prohibiting a free flow of contents into and out of the inlet.

Other aspects of the disclosure provide for a system includes an altitude control system for an unmanned aerial vehicle. The altitude control system can further include a compressor assembly. The compressor assembly includes a compressor housing, a rotating driveshaft, a bearing assembly, and a preloading mechanism. The compressor housing can be comprised of a first material that has a first coefficient of thermal expansion ("CTE"). The rotating driveshaft may be coupled to the compressor housing and include a second material having a second CTE. The bearing assembly can be coupled to the driveshaft. The bearing assembly can include an interior race extending around the driveshaft and a distal race extending around and spaced apart from the interior race by ball bearings that re positioned between the interior and distal races. The preloading mechanism can be configured to dynamically compensate for differences in the first CTE and second CTE throughout a flight of the unmanned aerial vehicle by continually changing a preloading force applied to the bearing assembly.

In one example, the preloading mechanism can further include a movable bearing carrier and a spring. The movable bearing carrier may underlie the bearing assembly and be movable along an axis parallel to the rotating driveshaft. The spring may be configured to bias the bearing carrier towards the bearing assembly. In a specific example, when the spring biases the bearing carrier, the bearing carrier is configured to move the distal race of the bearing assembly.

In another example, the bearing carrier can include a first upper portion, a second lower portion, and an intermediate projection therebetween. The bearing assembly may be positioned within the first upper portion and overlie a top surface of the intermediate projection. The spring may be positioned within the second lower portion of the bearing carrier, such that when the spring biases the bearing carrier, the spring is arranged to apply a force to a bottom surface of the intermediate projection opposite the top surface. The spring may be selected from a group consisting of a helical spring, a wave spring, and a conical spring washer.

In another example, the system can further include an envelope that is configured to retain ballast gas therein. The compressor assembly can regulate an amount of air within the envelope.

In yet another example, the compressor assembly can further include a motor housing that is disposed within an inlet of the compressor assembly, and an impeller overlying the motor housing.

Other aspects of the disclosure provide for a system that includes an altitude control system for an unmanned aerial vehicle. The altitude control system further includes an inlet opening and a valve system. The inlet opening is an opening to an interior portion of the unmanned aerial vehicle. The inlet opening has a circumferential area. The valve assembly can be coupled to the inlet opening and further includes a valve head, a driveshaft, and a motor assembly. The valve head can be configured to move into and away from the inlet opening so as to change a size of the circumferential area of the inlet opening. The driveshaft may be coupled to the valve head at a first end. The motor assembly may be coupled to a second end of the driveshaft. The valve head may be configured to move between a first fully extended position within the inlet opening and a second retracted position away from the inlet opening. When the valve head is in the first fully extended position, the valve head can be arranged to occupy an entire circumferential area of the inlet opening thereby prohibiting free flow of contents into and out of the inlet opening.

In one example, the inlet opening may be an inlet opening of an air compressor assembly. The air compressor may include a mixed flow compressor. Alternatively, the inlet opening can be an inlet opening to a base plate of a balloon.

In another example, mounting stanchions may be used to join the valve assembly to the inlet opening.

In yet another example, the valve assembly can further include a seal extending around an outer surface of the valve head. The seal may be arranged to form an air-tight seal between the valve head and the inlet opening when the valve head is fully extended within the inlet opening. The seal can be an energized seal that includes a jacket material partially enclosing a spring material.

In another example, the motor assembly can further include a motor and a motor housing and the altitude control system can further include a coupler configured to couple the motor to the driveshaft, a jam nut overlying the coupler, and a bearing assembly disposed between the motor coupler and the jam nut. The motor housing can define a bore that is configured to receive the driveshaft of the motor therethrough.

In another example, the motor housing can further include an explosion proof shaft seal disposed in the bore and mounted on the driveshaft of the motor. The motor housing can define an aperture configured to receive cables therethrough. The motor housing can further include an explosion proof seal disposed in the aperture. The motor housing can further include a flame arrestor.

In still another example, the system can further include an electronics control assembly that further includes a circuit board. The circuit board can further include a processor configured to control the compressor assembly. The circuit board of the electronics control assembly can also be hermetically sealed. The electronics control assembly can include a current sensor configured to measure leakage in current. The current sensor can be electrically coupled to the processor.

In yet another example, the system can further include an envelope configured to retain a ballast gas therein and a compressor assembly configured to regulate an amount of air within the envelope.

Other aspects of the disclosure provide a system for an unmanned aerial vehicle. The system can include an altitude control system that includes a compressor assembly and a valve assembly. The compressor assembly includes a compressor housing, a diffuser, a motor housing, a motor, and an impeller. The compressor housing that includes an inlet, an outlet, and a central cavity that extends therethrough. The compressor housing joins the inlet to the outlet. A diffuser may be coupled to the compressor housing. The motor housing may be disposed within the central cavity at the inlet of the compressor housing. The motor may be disposed within the motor housing. The impeller may be disposed within the compressor housing and coupled to a driveshaft for rotation therewith. The valve assembly may be coupled to an inlet opening of the inlet of the compressor. The valve assembly may include a valve head, a valve driveshaft, and a motor coupled to a second end of the driveshaft. The valve head may be configured to move into and away from the inlet opening so as to change a size of a circumferential area of the inlet opening. The valve driveshaft may be coupled to the valve head at a first end. The motor assembly may be coupled to a second end of the valve driveshaft. The valve head may be configured to move between a first fully extended position within the inlet opening and a second retracted position away from the inlet opening. When the valve head is in the first fully extended position, the valve head may be configured to occupy an entire circumferential area of the inlet opening and thereby prohibit free flow of contents into and out of the inlet opening.

In one example, compressor assembly can further include a rotating shaft assembly, a motor coupled to the rotating shaft assembly and a biasing element. The rotating shaft assembly can further include the compressor driveshaft, as well as a bearing assembly and a movable bearing carrier. The bearing assembly may be coupled to the driveshaft and include an interior race extending around the driveshaft and a distal race extending around and spaced apart from the interior race. The movable bearing carrier can house the bearing assembly. A motor can be coupled to the rotating shaft assembly. The biasing element can be coupled to the bearing carrier and be configured to bias the bearing carrier so as to preload the bearing assembly.

In another example, the system can further include an envelope and a compressor assembly. The envelope can be configured to retain a ballast gas therein and the compressor assembly can be configured to regulate an amount of air within the envelope.

In yet another example, the altitude control system can include an electronics control assembly that includes a circuit board that further includes a processor configured to control the compressor assembly. The circuit board of the electronics control assembly is hermetically sealed. The electronics control assembly may include a current sensor configured to measure leakage in current. The current sensor can be electronically coupled to the processor.

BRIEF DRAWING DESCRIPTION

DETAILED DESCRIPTION

A. Overview

Figure 1:
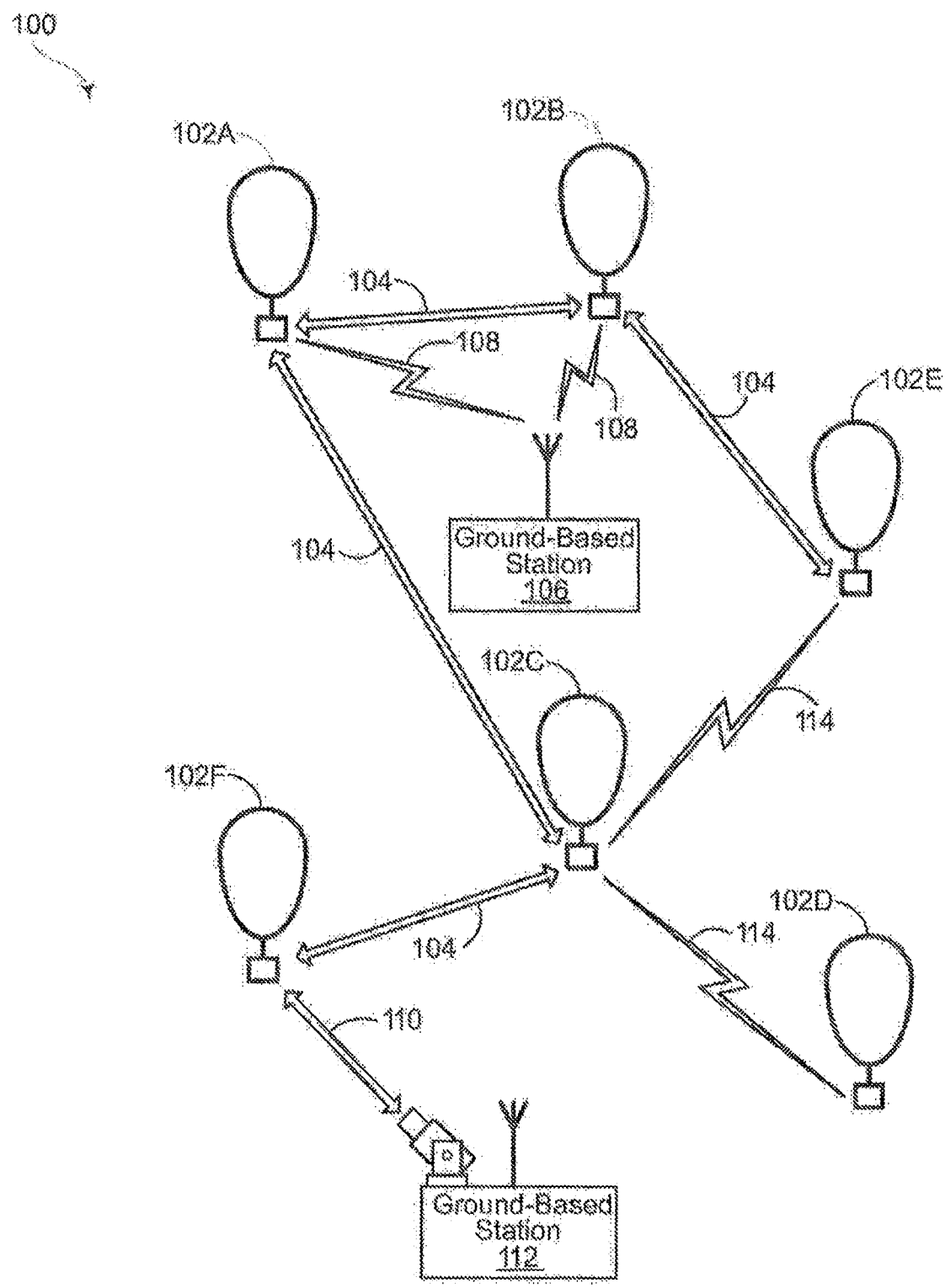
FIG. 1 is a functional diagram of a system in accordance with aspects of the present disclosure.

An altitude control system can be implemented within an unmanned aerial vehicle, such as balloons used in the stratosphere. According to aspects of the disclosure, an altitude control system for an unmanned aerial vehicle, such as balloons (including stratospheric balloons that can be used in the stratosphere), airships, etc. can include three primary subassemblies: (1) air compressor assembly; (2) valve assembly; and (3) electronics control assembly. These subassemblies cooperate to increase or decrease the altitude of the unmanned aerial vehicle, which can change the course of the balloon. In alternative examples, one or more different subassemblies may be substituted. Additionally, each of the subassemblies may be individually and independently used in other types of applications outside of unmanned aerial vehicles and/or stratospheric ballooning technology.

1. Overview: Improved Air Compressor for Altitude Control System

Axial and centrifugal air compressors are two types of air compressors implemented within turbomachines for use with altitude control systems for both manned and unmanned vehicles. Axial compressors provide low pressure and high inlet/outlet air velocity and centrifugal air compressors provide high pressure and medium inlet/outlet air velocity. Axial air compressors are also limited to the extent that they are capable of only achieving a modest pressure rise. The drawback to the use of centrifugal air compressors, however, is the creation of waste heat, stagnated air, and overall inefficient compression of air.

Mixed flow compressors present another type of air compressor. While traditional mixed flow compressors aim to combine the advantages of axial and centrifugal flow, the resulting combination is an air compressor that provides only moderate pressure and low inlet/outlet air velocity. The use of a traditional mixed flow compressor in any industrial application is therefore undesired due to its inability to provide either high air velocity or high compression ratio.

To address these issues, an air compressor assembly for use with the altitude control system of an unmanned aerial vehicle can be used to change the amount of air within an envelope by creating an increase or decrease in the amount of air provided to the balloon. In one example, a mixed flow compressor utilizes an inlet-mounted motor. This mixed flow compressor design can allow for the use of a high-power density motor to drive the air compressor by counteracting high levels of heat generated by the motor and causing motor failure because the motor is placed in the flow of cold air through the inlet of the device, cooling the motor. Furthermore, because unmanned aerial vehicles may primarily rely upon wind currents for movement, there is no need for an air compressor to produce high pressure or high velocity to move the balloon at high speeds. Mixed flow compressor designs in the configuration disclosed herein therefore provide an optimized solution for inclusion of an efficient air compressor assembly within a stratospheric balloon.

The mixed flow compressor assembly can include a diffuser, a compressor housing, including first and secondary compressor housings, a motor mounted within the inlet of the first compressor housing, and an impeller. When assembled together, these components define a central cavity or plenum of the mixed flow compressor. An opening at one end of the compressor housing may form an intake at the inlet end of the compressor assembly. The compressor housing defines a cavity therethrough to enable air or other fluid to flow through the compressor housing.

The primary compressor housing may be coupled to a diffuser. The secondary compressor housing may be positioned between the primary compressor housing the diffuser. The diffuser, primary compressor housing, and motor can be attached to the secondary compressor housing. The diffuser may be configured to convert the mechanical work done by a motor and an impeller of the compressor back into potential energy in the form of air pressure. The diffuser may efficiently convert the kinetic energy of the compressed, flowing air into higher pressure, static air in an envelope of the balloon.

The impeller draws air from the environment surrounding the altitude control system into the inlet of the compressor assembly and through the central plenum. The air drawn from the environment may be extremely cold and flows through the inlet into the central plenum and around the motor. This may cool down the motor and dissipate heat generated by the motor to prevent overheating. Positioning the motor within the inlet, as opposed to an outlet end or elsewhere in the device, enables use of a motor having high power density.

The mixed flow compressor assembly design may combine axial and radial components to produce a diagonal airflow compressor stage. In the present design, the exit mean radius of the airflow can be greater than at the inlet, like in a centrifugal design, but the flow will exit the compressor in an axial rather than radial direction.

The features of the disclosed mixed flow compressor with the motor positioned at the inlet allow for a compressor assembly that is significantly more efficient than prior versions. This is due in part to the cooling provided by the motor at the inlet end of the compressor. Such design allows for twice the ability to steer the unmanned aerial vehicle using half the power utilized in prior designs, and for significantly reduced mass.

2. Overview: Dynamic Axial Reloading Assembly for Air Compressor Bearing Assembly of Altitude Control System When implementing an altitude control system in a balloon, weight is paramount. The altitude control system must be made from durable materials capable of withstanding extreme temperature changes and harsh environmental conditions. A thermally conductive material may be desired to help cool down the motor. Moreover, to ensure that the weight of the altitude control system does not adversely affect balloon flight and lift, the selected materials cannot be too heavy. The housings and the majority of the components of the altitude control system are therefore typically comprised of aluminum, which is thermally conductive. Aluminum has the additional advantages of being a light-weight material, naturally corrosion resistant, ductile, and capable of maintaining the structure of the housings. Moreover, aluminum is approximately one-third the weight of steel, such that aluminum parts can be made thicker to increase their strength, while still allowing for an overall reduction in weight of the vehicle.

To enable manufacture of an altitude control system small enough to be used with an envelope of an unmanned aerial vehicle, a driveshaft made of steel can be implemented within the compressor assembly of the altitude control system. A driveshaft made from a lighter material having a coefficient of thermal expansion that can match the remainder of the altitude control system, such as aluminum, would have an excessive diameter necessary to provide the strength and stiffness of steel and would not be practical to employ. The result is an altitude control system with a shaft that expands and contracts at a different rate than the majority of the altitude control system.

In many instances, the bearings of the bearing assemblies become unloaded, which causes catastrophic failure. The mismatched coefficients of thermal expansion of steel and aluminum coupled with backpressure from within the balloon envelope, and the extreme temperature changes caused by the surrounding environment at high altitudes, may lead to failure of the altitude control system. Similarly, because the altitude control system must operate at very high rotational velocities, critical shaft rotor dynamic mode often occurs inside the operating range of the device and also leads to catastrophic failure.

The unexpected temperature changes that cause expansion and contraction of these components at different rates, as well as the advance and unknown temperature changes the altitude control system will encounter throughout the duration of its flight, make it difficult to predict and provide for a static preloading force that can be applied to the bearing assembly and that will be an appropriate force for the lifetime of the device. The solution to address these issues has been to carefully machine the compressor and shaft assembly components to specific tolerances to accommodate expansion and contraction of these materials. This procedure is time consuming, costly, and complex, both in terms of determining the appropriate tolerances, as well as machining components within the predefined tolerances. Moreover, such procedure provides many possibilities for failure since the tolerances must be accurately determined for each individual component, and the failure at any one of these components will result in overall failure of the altitude control system. Moreover, tolerancing components of the altitude control system are limited to the exact ranges of tolerances provided; anything outside of this predetermined tolerance will result in failure of the altitude control system.

To address such failures, a dynamic axial preloading assembly that can be integrated inside the motor housing of a device, such as an air compressor, and that can maintain bearing preload of a rotating shaft assembly in order to achieve a long-lasting device when ongoing maintenance cannot be performed may be used. Bearing preload can be critical to extend the life of the rotating shaft assembly of a motor within the unmanned aerial vehicle, which must fly for the duration of its life without returning to the ground. In accordance with aspects of the disclosure, radial support, in combination with dynamic axial preload can address shortcomings related to backpressure from within an envelope, mismatched coefficient of thermal expansion, and extreme temperature changes caused by the environment surrounding the aerial device. Such aspects help to eliminate the manufacture of individual components that separately address these shortcomings.

An example altitude control system may include a dynamic axial preloading assembly for the rotating shaft assembly of an air compressor of an unmanned aerial vehicle. The rotating shaft assembly can include a rotating driveshaft coupled at one end to the impeller, as well as a bearing assembly that is positioned within a bearing housing or carrier. The preloading assembly can include a bearing carrier and a biasing element to exert force on the bearing carrier, so as to "float" the bearing assembly that supports the shaft assembly.

The bearing carrier can be configured to move in an axial direction along the axis of the driveshaft due to the spring force exerted upon the bearing carrier. The biasing element may be any element configured to exert a force on the bearing carrier. The biasing element may be preloaded and can be adjusted to exert a preloading force on the bearing.

When in use, as the environment changes, the biasing element may press on the bearing carrier and the bearing assembly to keep the bearing assembly preloaded and engaged with an appropriate preloading force. This can help to prevent the catastrophic failure that would result from unloading the bearing at high speed. The biasing element therefore compensates for changes in atmosphere, backpressure, temperature, etc. that would otherwise affect the bearing assembly.

Thus, the features disclosed herein, provide for an altitude control system that utilizes an air compressor assembly with dynamic axial preloading for use with an unmanned aerial aircraft. Such features address the shortcomings associated with failure of the rotating shaft assembly of a motor within the unmanned aerial vehicle due to external forces to the bearing assembly caused by, for example, back pressure from within an envelope of the balloon, mismatched coefficient of thermal expansion between the steel driveshaft and aluminum housing, and large temperature changes caused by the environment surrounding a device within the unmanned aerial vehicle. In this regard, the features disclosed eliminate the need to manufacture individual components that separately address these shortcomings.

3. Overview: Valve Assembly for Altitude Control System

Valve assemblies can play an integral role in an altitude control system of unmanned aerial vehicles. The valve assembly can be used to regulate, direct, or control the flow of air by opening, closing, or partially obstructing a particular opening or passageway to an envelope of the unmanned aerial vehicle. Valve assemblies implemented as part of an altitude control system must operate in extreme conditions. Long flights and extreme temperature changes are encountered by the altitude control system and the valve assemblies of these systems. Known valve assembly designs require periodic maintenance, making such valves undesirable for use with long flights. Most known valve assemblies are capable of operating in only two positions: a completely open position or a completely closed position. Additionally, valve assemblies that provide a good seal are extremely heavy, and therefore not desired for use in connection with aerial vehicles, such as balloon assemblies. Finally, known valve assemblies are typically complex structures with multiple parts, some on the order of 100 parts.

To address these shortcomings, a valve assembly of the altitude control system can regulate, direct or control the free flow of air by opening, closing, or partially obstructing various passageways may be used. The valve assembly can be mounted to the inlet of an air compressor, such as the mixed flow air compressor described above, and the bellmouth-shaped inlet serves as the structural connection of the valve to the broader altitude control system and unmanned aerial vehicle. The features of the disclosed valve assembly can allow for effective operation of the valve assembly at high altitudes and allows for the contents of an envelope to remain sealed within the envelope at extremely low air temperatures. Additionally, the features of the disclosed valve allow for a lightweight valve assembly that requires little to no maintenance during flight. Additionally, such valve assembly can be made significantly less complex to manufacture and assemble, due to a reduction in the number of parts and the overall simple and streamlined design. This can compensate for the fact that there is no opportunity to repair or maintain the valve assembly for the duration of the flight.

The valve assembly can include a motor mount, mounting stanchions, valve head, a driveshaft, a bearing assembly, a motor coupler, and a motor. The motor mount may be the base structure to which the various components of the valve assembly are mounted. The mounting stanchions can be used to join the valve assembly to the compressor inlet.

The valve head can be configured to increase or decrease the circumferential area of the inlet opening through which air can travel to or from the compressor inlet and the envelope.

The movement of the driveshaft controls movement of the valve head into and away from the compressor inlet. The bearing assembly can extend around the driveshaft to facilitate rotational movement of the driveshaft. The motor coupler and the motor further facilitates rotation of the driveshaft, which further causes movement of the valve along the driveshaft between a fully extended distal position and a retracted proximal position.

In a fully extended position, the valve head and a seal carried by the valve head can be pressed up and into the air compressor inlet. The valve head can hold the gas or fluid contents of an envelope (outer or inner envelope) of the unmanned aerial vehicle. As the valve head moves into a retracted position away from the inlet and into the retracted proximal position, the seal retracts from the surface of the compressor inlet, allowing the fluid contents of the envelope to escape to the external environment of the unmanned aerial vehicle.

Thus, the features of the valve assembly disclosed herein provide for a configuration that allows for an effective structure to control the size of the circumferential opening of the inlet to which the valve assembly is attached, and ultimately to determine how much air is allowed into and out of the envelope. The features of the disclosed valve assembly can allow for effective operation of the valve assembly at high altitudes and allows for the contents of the envelope to remain sealed within the envelope at extremely low air temperatures, or for the envelope to be unsealed for either the addition or removal of ballast gas (e.g., air).

4. Overview: Electronics Control Assembly for Altitude Control System

Terrestrial applications for devices that must operate in explosive environments typically prevent catastrophe by being designed in an "intrinsically safe" way such that the system never has enough energy stored within it to exceed the energy of activation of the gas environment. Terrestrial intrinsic safety requirements require that there be less than 15 Joules in the circuit of the altitude control system at any given time. However, the components of the altitude control system: air compressor assembly, valve assembly, electronics control assembly, all require energy close to and/or in excess of 15,000 Joules. If a failure in any one component of the system causes a spark and an explosive gas is present, explosion may occur. Known precautionary measures that address these problems, however, tend to be extremely heavy and incompatible for use with unmanned aerial vehicles such as stratospheric balloons.

To address these issues and improve safety for altitude control systems utilized in unmanned aerial vehicles employing explosive gases, a specialized electronics control assembly may be used. The electronics control assembly may be mounted at the top of the compressor of the altitude control system, but it can also be located in other locations within sufficient distance to allow for communication with the altitude control system. The electronics control assembly can include many components, such as a motor thermal sensor, an electronic speed control thermal sensor, a compressor housing thermal sensor, a barometer, and a differential pressure sensor.

The altitude or direction of the unmanned aerial vehicle may be determined and controlled by an electronic control system, which includes a computing device that can cause the unmanned aerial vehicle to adjust its altitude to an altitude corresponding with a predetermined heading. In embodiments, the computing device may send a signal or data packet to a controller, the data packet including the altitude corresponding with the selected heading. In response, the controller may cause the unmanned aerial vehicle to adjust its altitude based on the predetermined flight path.

Thus, the electronic control system according to aspects of the disclosure can monitor current weather conditions, temperatures, and conditions within unmanned vehicles to better control and coordinate the operation of the air compressor assembly and valve assembly. This allows for an efficient altitude control system that can readily adjust the altitude and heading of the unmanned aerial vehicle.

5. Overview: Improved Safety Features for the Altitude Control System

When the altitude control system is used in connection with an unmanned aerial vehicle employing the use of explosive gases, such as explosive lift gas in a stratospheric balloon, there is a need to implement safety features within the altitude control system. Such safety features can be implemented within one or more assemblies within the altitude control system and can include early detection of gas leaks that can lead to ignition of the explosive gas, as well as enhanced structural features that better withstand and avoid the ignition of flammable gas.

5a. Improved Safety Features for the Compressor

A compressor motor, typically requiring hundreds of watts to operate, requires too much power to be made intrinsically safe. Secondary and tertiary safety provisions must be utilized to accommodate potential compressor motor failure. Thus, the materials and structure of an air compressor can be modified to increase the ability of the compressor to withstand an explosion that can occur when the air compressor is used adjacent explosive gases, such as use of the compressor adjacent a balloon envelope filled with explosive gases.

To prevent the electrical energy in the motor stator from shorting to ground or to another motor phase, slot liners for the various motor phase slots can be implemented and then double varnished or otherwise improved in dielectric strength. Compared to a traditional single-varnished motor, this adds two additional dielectric barriers for secondary and tertiary fault tolerance and increases the overall dielectric strength of the system. The compressor can also be formed from non-sparking materials such as brass or stainless steel.

Thus, these improved compressor safety features help to better regulate motor failure, as well as the possibility of sparking, which can cause combustion of the gases within the balloon.

5b. Improved Safety Features for the Valve Assembly

A toughened housing around the energy-carrying elements such as the drive motor and associated electronics can be designed to specifically withstand explosion in the valve assembly. For example, the valve motor may be enclosed in an explosion proof housing having a reinforced structure such that if a failure in the motor causes a spark in the presence of explosive lift gas, the resulting explosion is contained within the explosion proof housing. Several additional features may also be included in the valve housing design. Explosion proof seals on every penetration of the valve housing can be utilized. For example, the cable pass through can be strengthened and a shaft seal can be provided on the driveshaft of the valve mechanism. A small vent may be left with a flame-arresting feature which allows the system to "breathe," but prevents a flame from exiting and causing an external ignition by quenching or arresting the flame before the flame is able to exit the housing. Thus, these improved valve assembly safety features help to ensure that possible valve motor failure or other failure of the valve will not result in the ignition of explosive gases used within the system.

5c. Improved Safety Features for Control Electronics

The control electronics, like the compressor motor, may require more energy than "intrinsically safe" guidelines allow when using with explosive gasses. As such, the control electronics can also be designed to be operationally safe. For instance, thermal/environmental housing around the electronics can seal them off from the local air environment, preventing the explosive gas from direct exposure to energized traces and components on the board. In addition, current sensors on the board can also be used to track the current going into and out of the three phases of the compressor and valve motors. Thus, the extra safeguards for the control electronics provide for another means for providing a safer altitude control system by attempting to seal the motor from being exposed to explosive gas. Additionally, sensors that can be used to predict possible future failure can allow for a user of the system to shut down the system before the explosive gases can be caused to ignite.

EXAMPLES OF A SYSTEM, BALLOON OF THE EXAMPLE SYSTEM, AND EXAMPLE ASSEMBLIES AND EXAMPLE SAFETY FEATURES OF AN EXAMPLE ALTITUDE CONTROL SYSTEM OF THE EXAMPLE SYSTEM

1. Example System

FIG. 1 depicts an example system 100 in which an unmanned aerial vehicle as described above may be used. This example should not be considered as limiting the scope of the disclosure or usefulness of the features of the present disclosure. For example, the techniques described herein can be employed on various types of unmanned aerial vehicles and systems. In this example, system 100 may be considered a "balloon network" though in addition to balloons the network may include other types of unmanned aerial vehicles including other airships, etc. As such, the system 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

2. Example Aerial Vehicle

Figure 2:
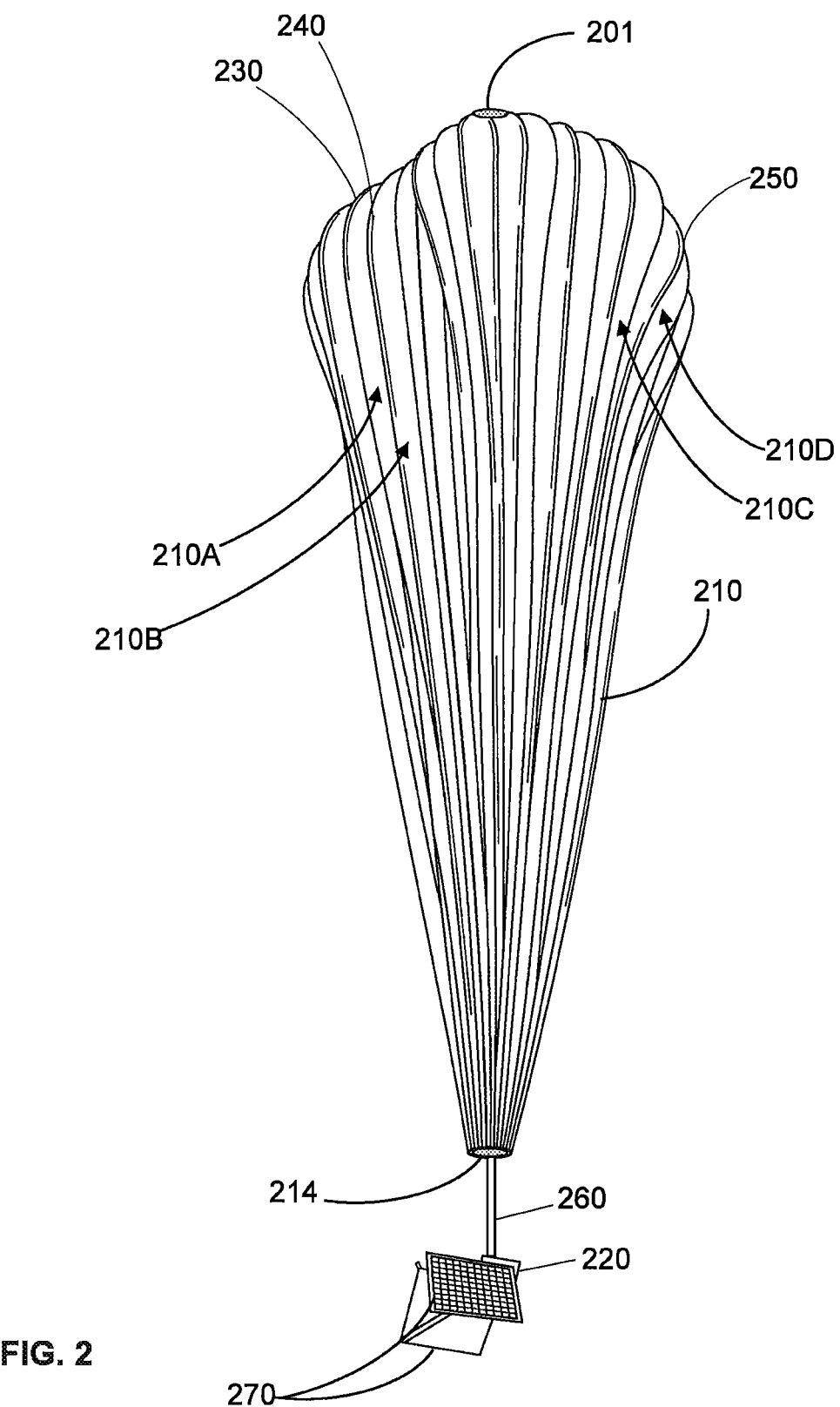
FIG. 2 is an example of a balloon in accordance with aspects of the present disclosure.

FIG. 2 is an example aerial vehicle, here a balloon 200, which may represent any of the balloons of the system 100. As shown, the balloon 200 includes an outer envelope 210, a payload 220 and a plurality of tendons 230, 240 and 250 attached to the outer envelope 210. The balloon outer envelope 210 may take various forms. In one instance, the balloon outer envelope 210 may be constructed from materials such as polyethylene that do not hold much load while the balloon 200 is floating in the air during flight. Additionally, or alternatively, some or all of outer envelope 210 may be constructed from a highly flexible latex material or rubber material such as chloroprene. Other materials or combinations thereof may also be employed. Further, the shape and size of the outer envelope 210 may vary depending upon the particular implementation. Additionally, the outer envelope 210 may be filled with various gases or mixtures thereof, such as helium, hydrogen or any other lighter-than-air gas. The outer envelope 210 is thus arranged to have an associated upward buoyancy force during deployment of the payload 220.

The payload 220 of balloon 200 may be affixed to the envelope by a connection 260 such as a cable or other rigid structure. The payload 220 may include a computer system (not shown), having one or more processors and on-board data storage. The payload 220 may also include various other types of equipment and systems (not shown) to provide a number of different functions. For example, the payload 220 may include various communication systems such as optical and/or RF, a navigation system, a positioning system, a lighting system) a plurality of solar panels 270 for generating power, a power supply (such as one or more batteries) to store and supply power to various components of balloon 200.

In view of the goal of making the balloon outer envelope 210 as lightweight as possible, the balloon envelope may be comprised of a plurality of envelope lobes or gores that have a thin film, such as polyethylene or polyethylene terephthalate, which is lightweight, yet has suitable strength properties for use as a balloon envelope. In this example, balloon outer envelope 210 is comprised of envelope gores 210A-210D.

Pressurized lift gas within the balloon outer envelope 210 may cause a force or load to be applied to the balloon 200. In that regard, the tendons 230, 240, 250 provide strength to the balloon 200 to carry the load created by the pressurized gas within the balloon outer envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using an apparatus, such as top plate 201 positioned at the apex of balloon outer envelope 210. A corresponding apparatus, e.g., bottom plate 214, may be disposed at a base or bottom of the balloon outer envelope 210. The top plate 201 at the apex may be the same size and shape as and bottom plate 214 at the bottom. Both caps include corresponding components for attaching the tendons 230, 240 and 250 to the balloon outer envelope 210.

Figure 3:
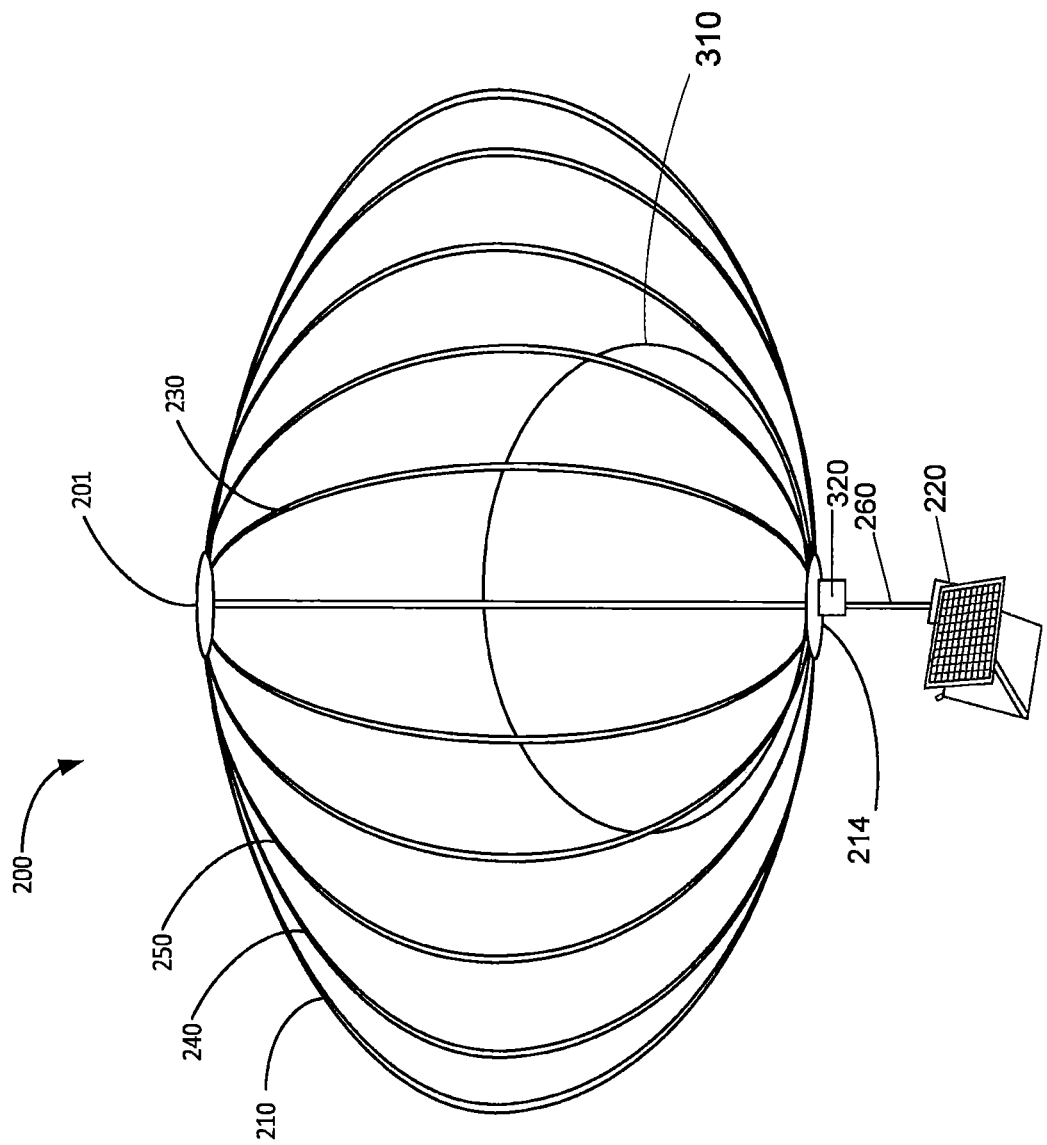
FIG. 3 is an example of a balloon in flight in accordance with aspects of the disclosure.

FIG. 3 is an example of balloon 200 in flight. In this example, the shapes and sizes of the outer envelope 210, connection 260, inner envelope 310, and payload 220 are exaggerated for clarity and ease of understanding. During flight, these balloons may use changes in altitude to achieve navigational direction changes. In this regard, the inner envelope 310 may be a ballonet that holds ballast gas (e.g., air) therein, and the outer envelope 210 may hold lift gas around the ballonet. Alternatively, in a reverse ballonet configuration, the inner envelope 310 may hold lift gas therein and the outer envelope 210 may hold ballast gas (e.g., air) around the inner envelope 310, and the inner envelope 310 may hold the lift gas therein.

Figure 4:
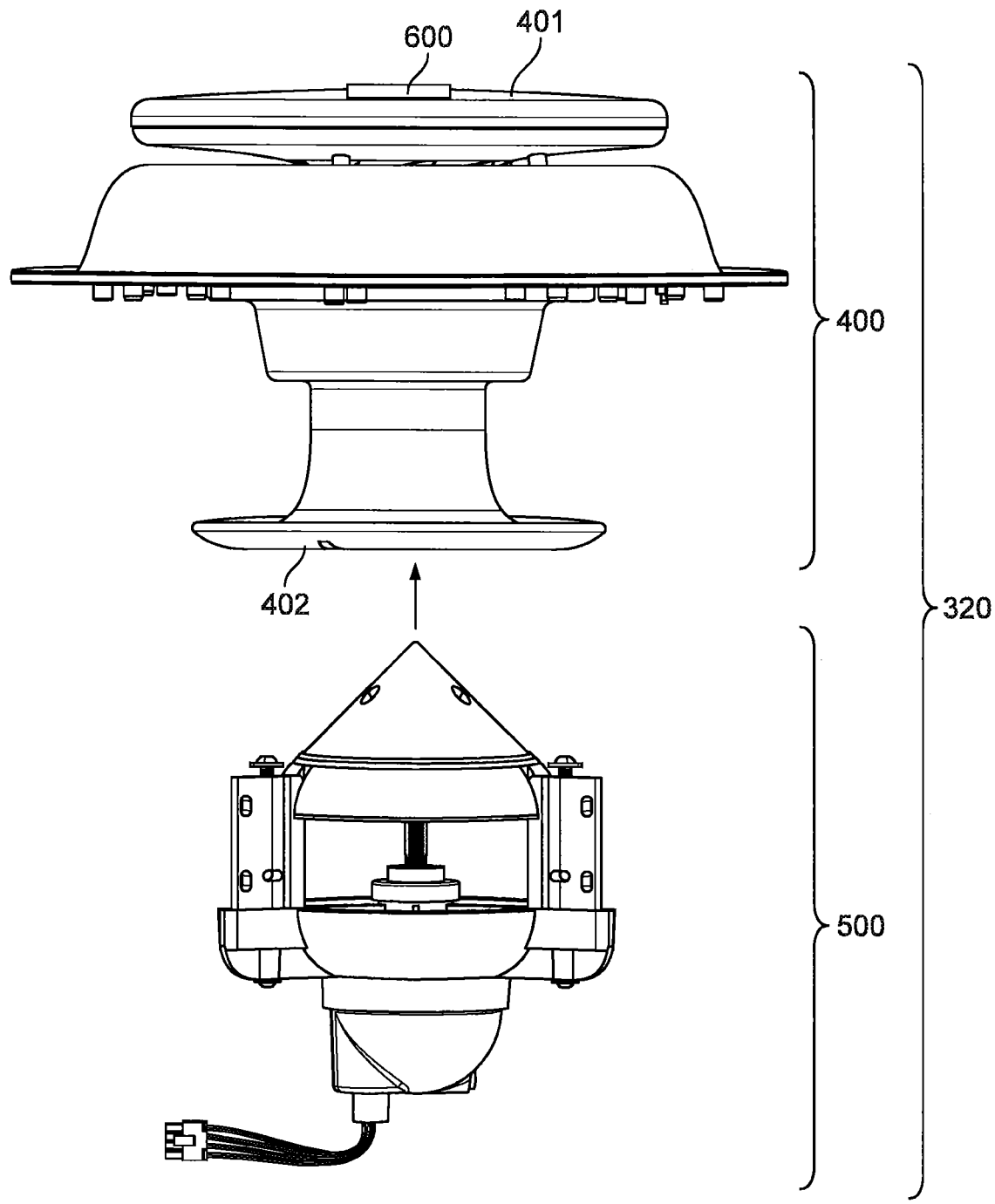
FIG. 4 is an example altitude control system in accordance with aspects of the disclosure.

An altitude control system 320 may be positioned at the bottom plate 214 of the balloon to effect changes in altitude. FIG. 4 is an exploded view of an example altitude control system that includes a (1) mixed flow compressor assembly 400 with inlet-mounted motor; (2) valve assembly 500; and (3) electronics control assembly 600. The compressor assembly 400 can include a ballonet shroud 401 that can be directly joined to and positioned within an opening in the bottom plate 214. The valve assembly 500 can be directly connected to an opening in the air compressor to regulate the amount of air into and the contents out of the compressor. The electronics control assembly 600 can be positioned within an opening to the ballonet shroud 401.

The compressor assembly 400 of the altitude control system can cause ballast gas (e.g. air) to be pumped into the inner envelope 310 within the envelope 210, which increases the mass of the balloon and causes the balloon to descend. Similarly, a valve head 502 (see FIG. 11) of the valve assembly 500 may retract from the inlet of the air compressor and may cause air to be released from the inner envelope 310 (and expelled from the balloon) in order to reduce the mass of the balloon and cause the balloon to ascend. The electronics control assembly 600 may be mounted at the top of the compressor assembly 400.

3. Example Air Compressor with Inlet Mounted Motor

Figure 5:
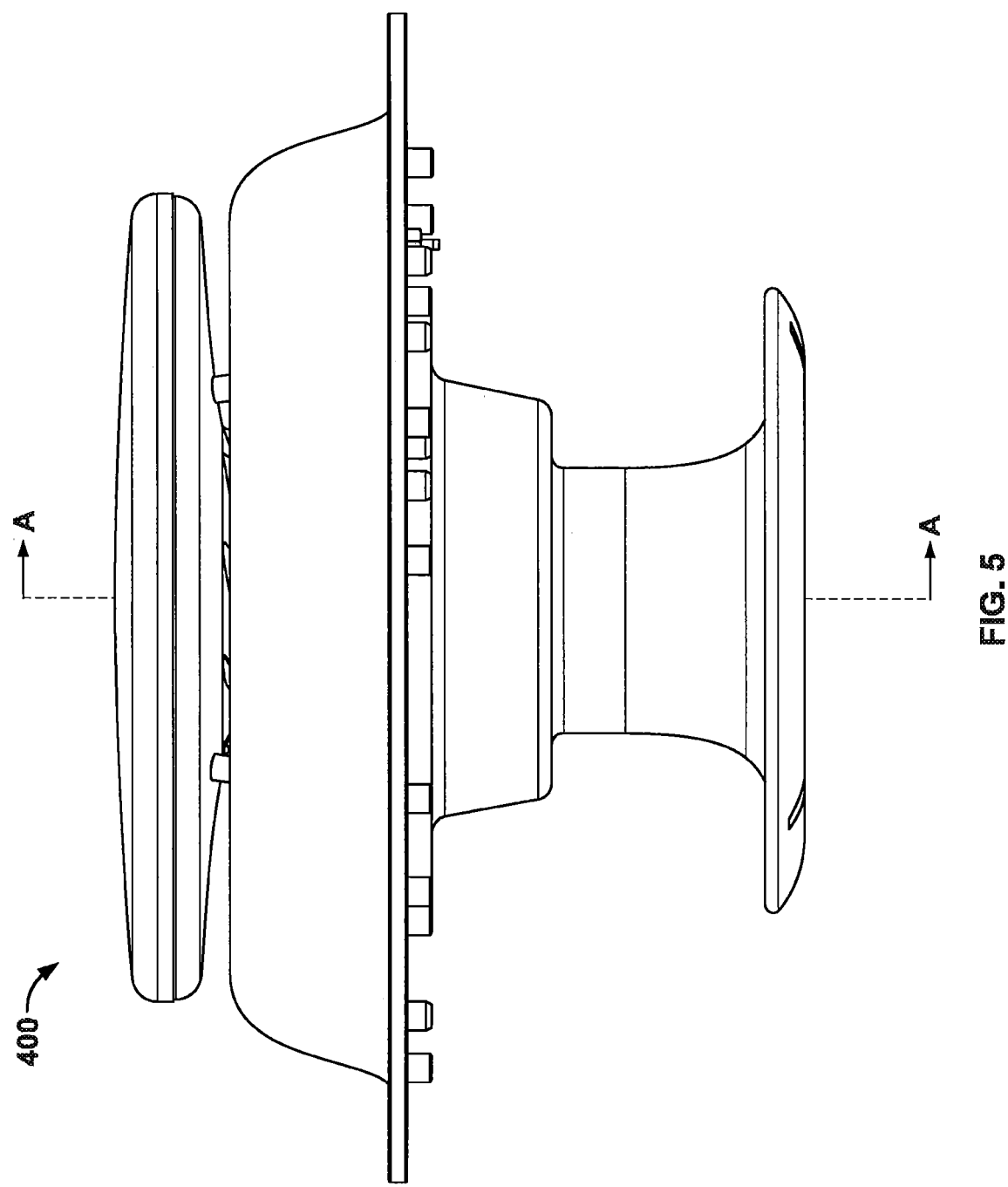
FIG. 5 is a mixed flow air compressor with inlet mounted motor in accordance with aspect of the disclosure.

FIG. 5 is an example compressor assembly 400 for use with the altitude control system 320. The compressor assembly 400 can be used to change the amount of air within an envelope (such as an outer envelope 210 and/or the inner envelope 310) by allowing for an increase or decrease in the amount of air provided to the envelope. For instance, a compressor of the air compressor assembly can be configured to provide air to the envelope at a rate and volume of air to allow for flight at high altitudes. For example, when a change in altitude is desired, the compressor can drive air into the envelope 210 and/or the inner envelope 310, thereby increasing the overall density of the system. This will cause the balloon to descend and decrease in altitude.

Figure 6:
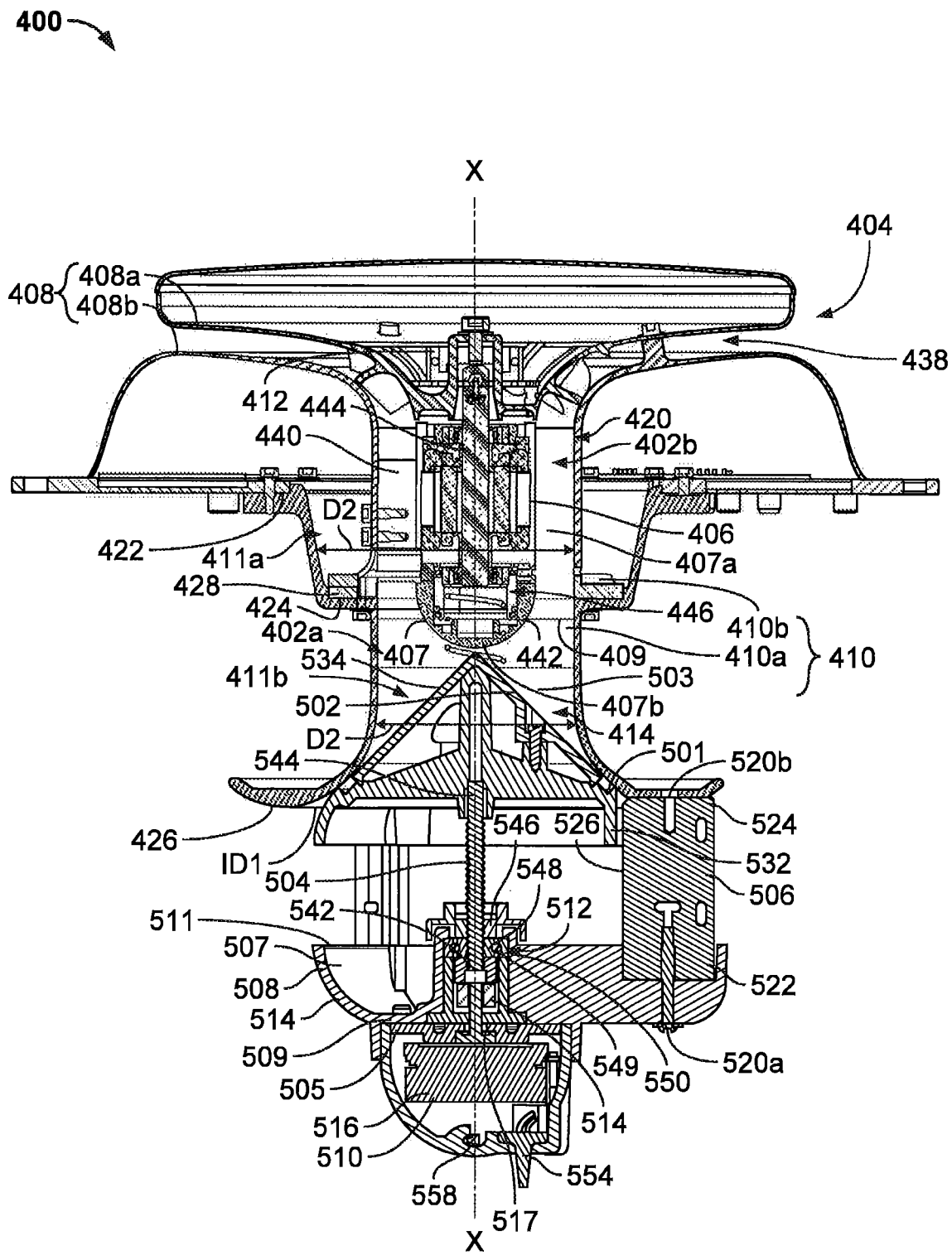
FIG. 6 is cross-sectional view taken along line A-A of FIG. 5.

In one example, as shown in the cross-sectional view of FIG. 6 (through A-A of FIG. 5), the compressor assembly 400 can be a mixed flow compressor that includes a compressor inlet 402, an outlet 404, and a compressor motor 406 mounted at the compressor inlet 402 of the compressor assembly 400. This mixed flow compressor design can allow for the use of a small and high-power density motor to power the air compressor by counteracting high levels of heat generated by the motor and causing motor failure. Furthermore, because unmanned aerial vehicles such as stratospheric balloons and airships primarily rely upon wind currents for movement, there is no need for an air compressor to produce high pressure or high velocity to move the balloon at high speeds. Mixed flow compressor designs in the configuration disclosed herein therefore provide a suitable solution for inclusion of an efficient air compressor assembly within an unmanned aerial vehicle.

The mixed compressor assembly 400 may include various structural features. For example, as shown in FIG. 6, the mixed flow compressor can include a diffuser 408, a compressor housing 410, including a primary compressor housing 410a and a secondary compressor housing 410b, a compressor motor 406 mounted within the compressor inlet 402 and impeller 412. When assembled together, these components define a cavity 414 or plenum of the mixed compressor assembly 400. As shown, the cavity 414 may be a central cavity.

The compressor housing 410 can be generally cylindrical. An entrance or opening 416 at the entrance to the compressor inlet 402 of the compressor assembly 400 can form an intake for air. The compressor housing 410 defines a cavity 414 therethrough to enable air or other fluid to flow into and out of the compressor housing 410. In one example, the cavity 414 extends entirely through the compressor housing, with the interior surface 409 of the compressor housing forming a perimeter of the cavity 414. The opening 416 can have an inlet opening diameter ID1 that is greater than the diameter D1 of the majority of a length of the cavity 414. This can allow for greater intake of air at the entrance to the compressor inlet 402.

The overall shape of the compressor housing 410 can define a generally dish-shaped profile having a circular configuration. For example, an outer dimension of the compressor housing 410 may decrease along a longitudinal axis X-X defined through a center portion of the compressor housing 410. Although generally illustrated as having a circular configuration that corresponds to the circular configuration of the diffuser 408, the compressor housing 410 may alternatively include any suitable configuration, and may be the same or different configuration as the diffuser 408. The compressor housing 410 may be formed of at least one of aluminum, brass, or stainless steel, although other types of material may be contemplated.

The compressor housing 410 can include a primary compressor housing 410(a) and a secondary compressor housing 410b joined together to form the completed compressor housing 410. Alternatively, a monolithic housing may be used, or a compressor assembly comprised of more than two primary portions may be used. As shown in FIG. 6, the primary compressor housing 410a extends between a first surface 422 and an opposing second surface 424. The second surface 424 of the primary compressor housing 410a transitions to a lower inlet portion 402a having a cylindrical profile that is coaxial with the longitudinal axis X-X. In this manner, the profile of the compressor housing 410 transitions from a cup or dish shaped profile to a cylindrical profile. The primary compressor housing extends from the second surface 424 to a third surface 426 at the opening to the compressor inlet 402. The shape of the primary compressor housing 410a can allow for an upper compressor portion 411a, which has a diameter D2 that is greater than a diameter D1 of a lower compressor portion 411b.

The secondary compressor housing 410b can be positioned between the primary compressor housing 410a and the diffuser 408. The secondary compressor housing may have a generally cylindrical profile. An interior cavity 420 may extend therethrough and form an upper inlet portion 402b of the compressor inlet 402. The secondary compressor housing 410b can be sized to fit within the upper compressor portion 411a of the primary compressor housing 410a. A flange 428 of the secondary compressor housing 410b can be attached to the second surface 424 of the first primary compressor housing to secure the secondary compressor housing 410b within the primary compressor housing. Once the primary and secondary compressor housings 410a and 410b are joined together, the cavity 414 of the primary compressor housing 410a and the interior cavity 420 of the secondary compressor housing 410b are aligned along the X-X axis to form the cavity 414 or plenum extending through the length of the compressor assembly 400. The diffuser 408, primary compressor housing 410*a*, and compressor motor 406 are attached to the secondary compressor housing 410*b*.

The diffuser 408 includes a first curved lower portion 408*a* that can be attached to the secondary compressor housing and a curved upper portion 408*b* spaced apart from the first curved lower portion 408*a* so as to define a conduit or passageway 438 therebetween. This passageway 438 may allow air moving through the cavity 414 to freely flow out of the secondary compressor housing 410*b* and the compressor assembly 400 and for instance, into an envelope an envelope (such as outer envelope 210 and/or the inner envelope 310). As shown, the diffuser 408 may have a generally planar configuration with a circular profile. Of course, the diffuser may include any suitable profile, such as square, rectangular, and oval, amongst others.

The diffuser 408 may be configured to convert the mechanical work done by the compressor motor 406 and impeller 412 of the compressor assembly 400 back into potential energy in the form of pressurized air. Because of the shape of the diffuser 408, the diffuser changes the direction of the compressed air and slows and expands the air. As such, the diffuser can efficiently convert the kinetic energy of the compressed, flowing air into higher pressure, static air in the outer envelope 210 and/or inner envelope 310 of the balloon.

A motor housing 407 may house a compressor motor 406. The compressor motor 406 may be of any variety with sufficient torque and speed to drive the system. For instance, the motor may be a brushless DC, brushed DC, or another suitable motor so long as the motor is paired with a suitable controller to operate the motor.

The compressor motor 406 and its motor housing 407 can be positioned within the compressor inlet 402 of the compressor assembly 400. For example, the motor housing 407 may be positioned along and aligned with the axis x-x extending that extends through the cavity 414 and compressor inlet 402 of the compressor assembly 400. The impeller 412 can overlie the compressor inlet 402, compressor motor 406, and motor housing 407. In this configuration, the compressor inlet 402 can extend an entire length of the cavity 414 of the compressor housing 410 up to the impeller 412, such that the entire motor housing 407 can be positioned within the compressor inlet 402. The motor housing 407 can therefore be positioned between the opening 416 to the compressor inlet 402 and the impeller 412. The impeller 412 can be positioned at the outlet 404 of the compressor housing 410.

The inlet end 407*b* of the motor housing 407 can be positioned closer to the opening 416 of the compressor inlet 402 than the impeller 412. In the example shown, the motor housing can be positioned so that the outer surface 442 of the motor housing 407 is spaced away from the interior surface 409 of the compressor housing 410. This can allow for the free flow of air all around the outer surface 442 of the motor housing 407.

Figure 7:
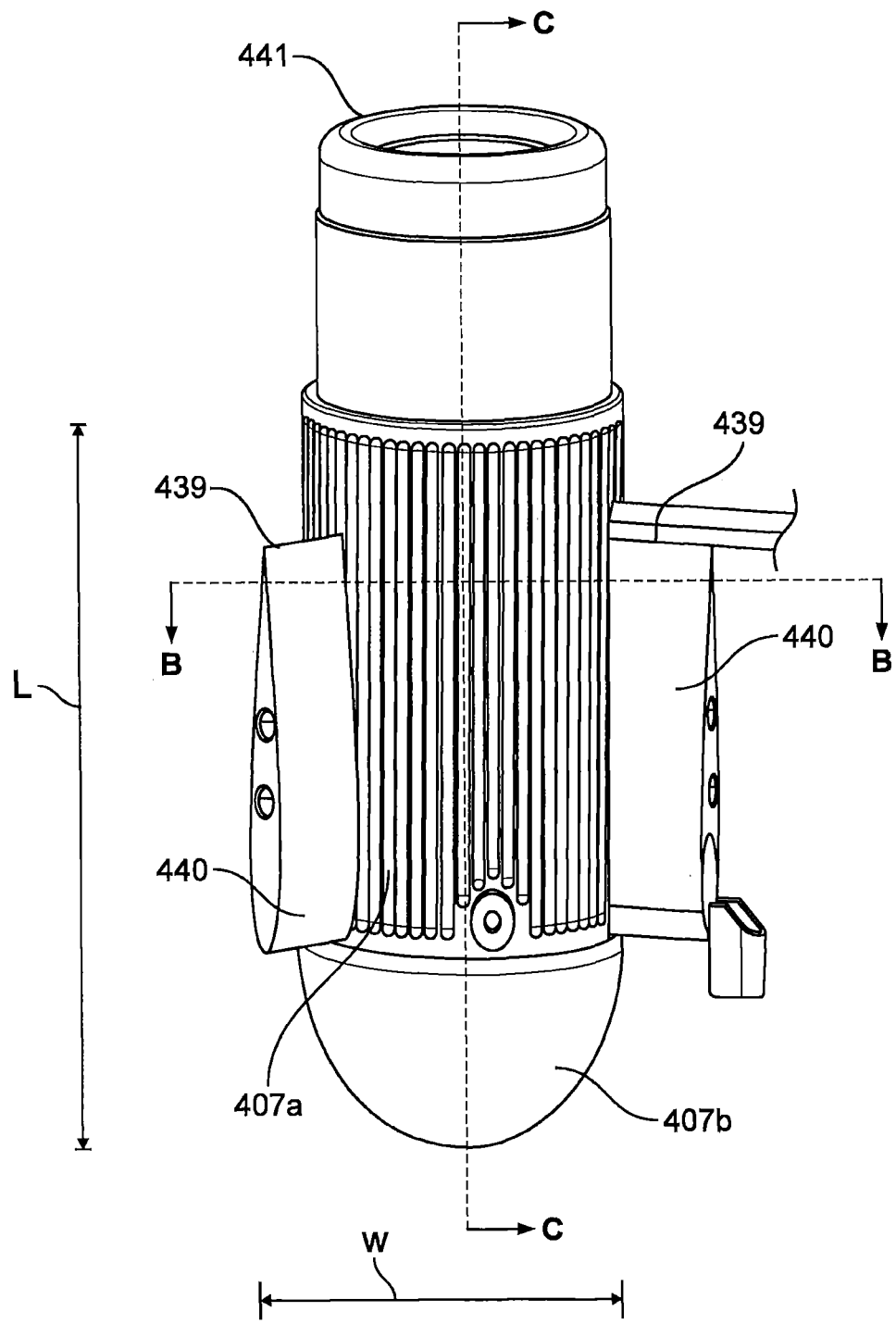
FIG. 7 is a perspective view of the example motor housing of FIG. 6 in accordance with aspects of the disclosure.

The motor housing 407 can be shaped to allow for substantial portions of the motor housing 407 to be positioned within the cavity 414. An example motor housing 407 is shown in FIG. 7 (and the corresponding cross-sectional views in FIGS. 8 and 9). In this regard, FIG. 7 provides a view of the motor housing 407 removed from the compressor housing 410 for ease of discussion. The motor housing 407 may be partially pill-shaped, with a main body 407*a* having an elongated length L greater than its W, and the inlet end 407*b* that is curved. The motor housing 407 can take on any other shapes sized to fit within the cavity 414 and compressor inlet 402, including, square, rectangular, curved.

The motor housing 407 may be coupled to the compressor housing. For example, the motor housing 407 may be press fit, thermally press fit, attached by fasteners, brazing, welding, or other suitable means to the compressor housing. In the example shown, mounting fins 440 extending from the motor housing 407 may be used to attach the motor housing 407 to the secondary compressor housing 410*b*. As shown, the mounting fins 440 may be elongated and extend along a majority of the length of the motor housing 407, but may also extend along more or less of the motor housing 407. The mounting fins 440 may be tear-drop shaped to allow for air to flow around and over the mounting fins 440, though other shapes may also be used. In this example, the widest part W of the mounting fin 440 is positioned closer to the inlet end 407*b* of the motor housing and may be tear-drop shaped. The tip 439 of the mounting fin 440 is positioned closer toward atop 441 of the motor housing 407 than the inlet end 407*b*.

Figure 8:
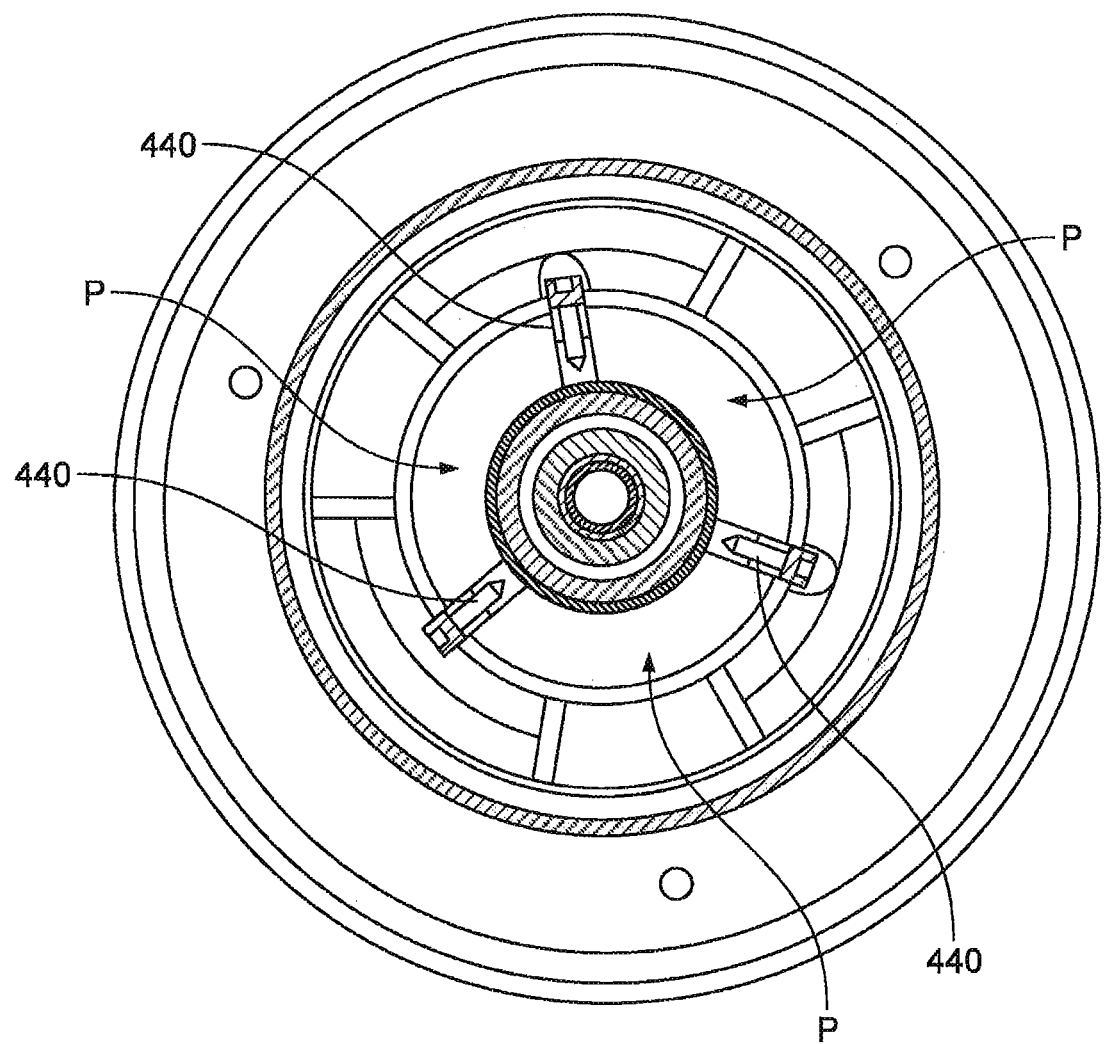
FIG. 8 is a cross-sectional view taken along line B-B of FIG. 7.

The mounting fins 440 can extend around the circumference of the motor housing 407. For example, two or more fins can be provided to mount the motor housing 407 to the compressor housing. Three or more fins can provide for greater stability and to aid the extraction of heat from the compressor assembly 400. In one example, as shown in FIG. 8, a cross-sectional view through B-B of FIG. 7, three mounting fins extend around the motor housing. The mounting fins 440 may be equally spaced 120° apart from one another. The arrangement of the mounting fins can create passageways P within the central cavity to direct air through the cavity of the housing. Additionally, the mounting fins 440 can be comprised of a thermally-conductive material that can draw heat from the motor. In one example, the mounting fins can be comprised of copper, but other thermally-conductive materials can be used.

When the unmanned aerial vehicle, such as balloon 200, is in flight, the compressor motor 406 can cause rotation of the driveshaft 444, which in turn causes the impeller 412 to rotate. As the compressor motor 406 continues to rotate the driveshaft 444 and impeller 412, excessive amounts of heat are generated by electrical losses in the motor elements and mechanical losses in the bearings. Generating excess amounts of waste heat results in the loss of air that could have been compressed, thereby resulting in an inefficient compressor.

To dissipate heat generated by the driveshaft rotation, the motor housing can be cooled down. In one example, air can be drawn from the environment surrounding the altitude control system 320 into the opening 416 of the compressor inlet 402 of the compressor housing 410. The air drawn from the environment at high altitudes is extremely cold, and can be at least as low as, for example, 55° C. The air drawn from the environment may pass through the lower portion of the compressor inlet 402 and around the motor housing 407. The air can then be distributed into passageways P created by the mounting fins 440 positioned within the cavity 414. As the air passes over the mounting fins 440, the air is forced to accelerate over the widest part W of each of the mounting fins 440. This distribution of the air through the passageways P and around the motor housing 407 may cool down the motor and dissipate heat. At the same time, this may help to prevent excess heat generated by the motor from damaging the various parts of the motor. Air can be accelerated through the passageway and then compressed, as the air passes through the impellers. The air is then caused to slow down by the diffuser, as the air exits the cavity 414 and is diffused through the diffuser 408.

Positioning the compressor motor 406 and motor housing 407 as shown in FIG. 6, for instance within the compressor inlet 402 and, according to the path of air flow from the compressor inlet 402 to the outlet 404, prior to the impeller 412 and outlet 404, may enable the use of a motor that has high power density. This is because heat generated by such high-power density motor is transferred to the flowing cold air.

The mixed compressor assembly 400 combines axial and radial components to produce a diagonal airflow compressor stage or compressed air that exits the air compressor assembly at an angle to the axis. For example, in the present design, the exit mean radius of the airflow can be greater than at the inlet, like in a centrifugal design, but the flow will exit the compressor in a direction tangential to the axial airflow. The airflow will enter the compressor through the inlet and pass through the compressor in an axial direction, but due to the angled edge of the compressor housing and diffuser, air is routed tangentially away from the axial direction. For example, the air may be dispersed through the outlet at a 45-degree angle, but the angle may range from 25 to 65 degrees. In other examples, the angles may alternatively be below 25 degrees and greater than 65 degrees.

Figure 9:
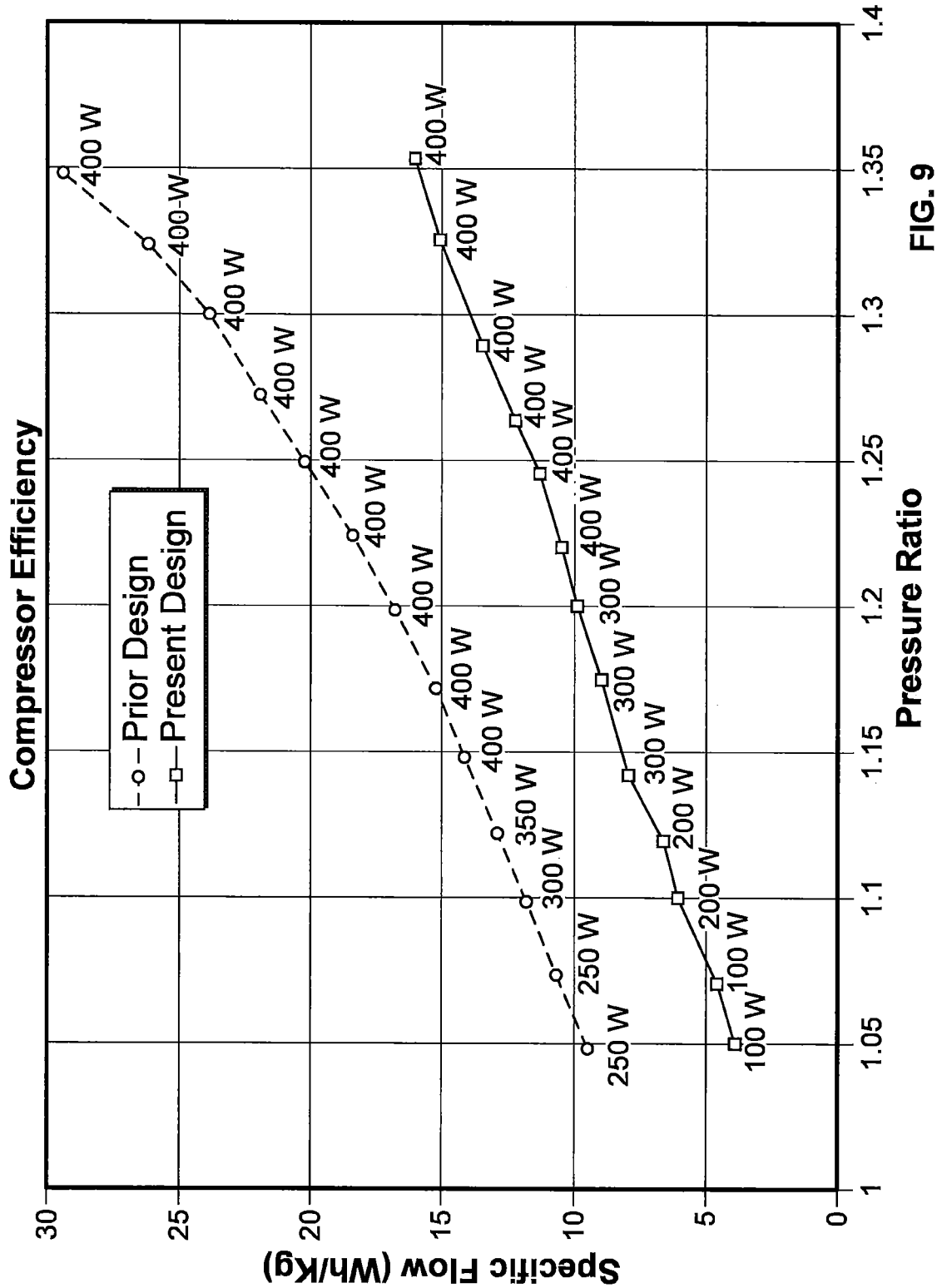
FIG. 9 is a chart showing the efficiency of a compressor assembly according to aspects of the disclosure as compared to a prior compressor assembly.

The features of the disclosed mixed flow compressor assembly with the motor positioned at the inlet can allow for a compressor assembly that is significantly more efficient than prior versions. For example, FIG. 9 illustrates a chart that compares the efficiency of: (1) the present air flow compressor assembly (bottom line of the chart)—one where the motor housing is positioned within the inlet of the compressor housing between the impeller and the intake; and (2) prior compressor assembly that does not include a motor positioned within the inlet (top line of chart). The prior compressor assembly may be a centrifugal compressor that is twice as heavy and includes an outlet-mounter motor (i.e., the motor is mounted above the diffuser instead of below the impeller). As shown, the efficiency of the present compressor design-mixed flow processor with inlet mounted motor is significantly greater than the efficiency of the prior compressor design. The present design is capable of achieving the same.

Other types of air compressors may be used in place of the mixed compressor assembly 400, in combination with the other subassemblies of the altitude control system 320 (i.e., the valve assembly, control electronics control assembly, and features of the mixed flow air compressor assembly, such as preloading) discussed herein. Some of these alternative air compressors may be more or less efficient, less effectively address the heat issues, and/or require reconfiguration and/or reorientation of one or more components of the compressors. Nonetheless, the use of such compressors can alternatively be used to adjust the altitude and direction of an unmanned aerial vehicle.

4. Example Dynamic Axial Preloading Assembly for Air Compressor Bearing Assembly The example compressor assembly 400 can further include a preloading assembly 446 for a rotating shaft assembly of the compressor assembly of an unmanned aerial vehicle, such as balloon 200. The preloading assembly 446 may be a dynamic preloading assembly and may address the shortcomings associated with failure of the rotating shaft assembly due to external forces that can cause the bearing assembly to fail. For example, back pressure from within the envelope an envelope (such as the inner envelope 310 or the outer envelope 210 in the case of a reverse ballonet configuration), mismatched coefficient of thermal expansion between the steel driveshaft and aluminum housing, and large temperature changes caused by the environment surrounding a device within the unmanned aerial vehicle.

Figure 10:
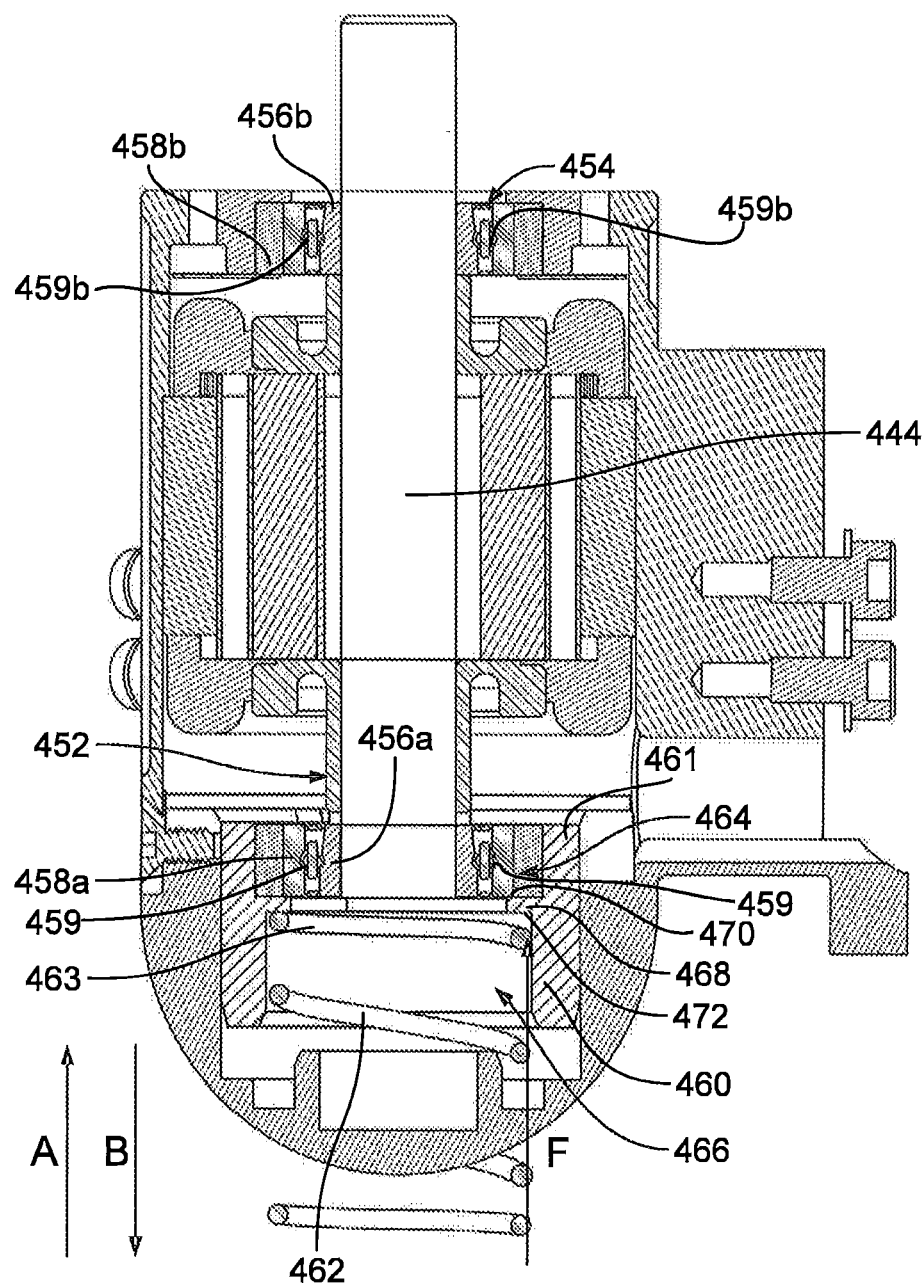
FIG. 10 is a cross-sectional view taken along line C-C of FIG. 7.

FIG. 10 illustrates an enlarged cross-sectional view of the motor housing 407 though C-C of FIG. 7 of the compressor assembly 400 depicting preloading assembly 446. For ease of discussion, FIG. 10 includes only the components necessary to describe the preloading assembly 446, and features such as the impeller 412 are not included in FIG. 10. As shown, the compressor motor 406 is housed within the motor housing 407. The rotating shaft assembly can include the rotating driveshaft 444 coupled at one end to the impeller 412, a first bearing assembly 452 that is positioned within a bearing housing or carrier 460, and a second bearing assembly 454 that is positioned at an opposed end adjacent the impeller 412. The preloading assembly 446 includes a bearing carrier 460 and a biasing element, such as a spring 462, to exert a force on the bearing carrier 460, so as to "float" or spring load the bearing assembly that supports the shaft assembly.

The first and second bearing assemblies can facilities rotation of the rotating shaft assembly. The first bearing assembly 452 can be a ball bearing assembly. A first inner race 456a can be attached to and extend around the circumference of the driveshaft 444. A second outer race 458a can be radially spaced apart from the first inner race 456a by ball bearings 459 and can extend around the circumference of the driveshaft 444. The second outer race 458b can be coupled to the bearing carrier 460 and in this example can be fixed to the bearing carrier 460. The first inner race 456a can rotate with the driveshaft 444 relative to the fixed second race 458a.

The second bearing assembly can also be a ball bearing assembly, with a first inner race 456b, a second outer race 458b, and ball bearings 459b disposed between the first and second races 456b, 458b. The second outer race 458b can be coupled to the bearing carrier 460 and in this example can be fixed to the bearing carrier 460. The first inner race 456a can rotate with the driveshaft 444 relative to the second race 458a which may be fixed.

The bearing carrier 460 can be directly coupled to the first bearing assembly 452 and can be configured to move in an axial direction along the axis X-X of the driveshaft 444. The bearing carrier 460 may be a cylindrical bore having a first upper portion 464, a second lower portion 466, and an intermediate projection 468 separating the first and second portions 464, 466. The intermediate projection 468 includes a top surface 470 and an opposed bottom surface 472. The top surface 470 can provide a seating surface that supports at least a portion of the first bearing assembly 452. For example, the first bearing assembly 452 may be positioned within the bearing carrier and such that the top surface 470 supports the second outer race 458b of the first bearing assembly 452. As shown, the top surface of the intermediate projection can be in direct contact with the second outer race 458b of the first bearing assembly 452.

To keep the bearing carrier 460 from rotating with the supported driveshaft assembly, an anti-rotation device may be used. For example, a machine key 461 arranged within in a slot, a series of guide pins, or any other device with axial clearance can be used to limit rotational movement of the bearing carrier 460 within the motor housing 407.

A biasing element may be coupled to the bearing carrier 460. The biasing element may be any element configured to exert a force on the bearing carrier 460. As shown in the example of FIG. 10, the biasing element may be a spring 462 positioned in the second portion 466 of the bearing carrier 460 and in contact with the bottom surface 472 of the intermediate projection 468. For example, the spring may be a traditional helical spring or a wave spring. Such spring may be made from steel or aluminum, but other materials may also be used. Alternatively, the biasing element may be a plurality of conical spring washers, such as Belleville washers. Other types of biasing elements may be contemplated.

The biasing element may be positioned with the second lower portion 466 of the bearing carrier 460. For instance, the spring 462 may fit within and occupy the second lower portion 466 of the bearing carrier. The top surface 463 of the spring 462 can be positioned directly adjacent to the bottom surface of the intermediate projection. In other examples, due to the configuration of the spring or device, an intermediate surface can be positioned between the spring 462 and the bottom surface of the intermediate projection 468.

The biasing element can exert a biasing force against the bearing carrier 460 to cause movement of the bearing carrier along the axis X-X of the driveshaft 444. For example, the spring 462 may apply a biasing force F against the bottom surface 472 of the intermediate projection 468. The biasing force F can cause movement of the bearing carrier 460 in axial direction A or an axial direction B, as shown in FIG. 10.

The biasing force can provide an axial preload of the first bearing assembly 452. For example, because the bearing carrier 460 supports the second race 458, movement of the bearing carrier causes movement of the second race 458a relative to the first inner race 456a due to the biasing force. The second bearing assembly 454 can also be axially preloaded by the movement of the bearing carrier 460 and the preloading force.

As noted above, when the unmanned aerial vehicle, such as balloon 200, is in flight, the vehicle will be subject to extreme environmental changes. The temperature changes will then cause the components of the altitude control assembly to expand and contract at different rates due to the differences in thermal expansion between the shaft and components of the assembly formed from a different material. For example, the driveshaft 444 may be made of steel which will have a different coefficient of thermal expansion than other components formed from lighter materials, such as aluminum. Additionally, back pressure from the envelope (such as outer envelope 210 and/or the inner envelope 310) will also change due to the change in temperature and exert a varying aerodynamic force/load on the impeller. Thus, the necessary preloading force must continually change throughout the flight of the vehicle to accommodate these and any other forces that may cause the first and second races to become separated, thereby causing bearing failure.

The preloading assembly 446 may be configured to dynamically adjust the necessary bearing preload to compensate for changing loads due to differing rates of thermal expansion, back pressure from the envelope, and any external forces that may cause bearing failure. For example, back pressure from the envelope and/or the forces on the driveshaft 444 caused by differing rates of thermal expansion may decrease or increase over time. The spring can apply a force F to the bearing carrier that is equal to the initial backpressure force, but as the backpressure force decreases, the spring may accommodate for the decrease and also decrease the force applied to the bearing carrier. This decrease in force may cause the bearing carrier 460 to move in a downward direction B, thereby also causing the second races 458a, 458b of the first and second bearing assemblies 452,454 to move in a downward direction. Similarly, if the back pressure increases, the spring may apply an increased force Fin response to the increased back pressure force causing an upward axial force and the bearing carrier 460 to move in an upward direction. The spring can increase or decrease the force applied to the bearing carrier 460 based on the forces created by the extreme temperature changes and the resulting expansion and contraction of the components that have differing coefficients of thermal expansion. As such, the preloading assembly 446 can essentially "float" the bearing assembly to ensure that the bearings are always preloaded and engaged.

Thus, the features disclosed herein, provide for an altitude control system that utilizes an air compressor assembly with dynamic axial preloading for use with an unmanned aerial aircraft. Such features address the shortcomings associated with failure of the rotating shaft assembly of a motor within the unmanned aerial vehicle due to external forces to the bearing assembly caused by, for example, back pressure from within the envelope (such as outer envelope 210 and/or the inner envelope 310), mismatched coefficient of thermal expansion between the steel driveshaft and aluminum housing, and large temperature changes caused by the environment surrounding a device within the unmanned aerial vehicle. This can help to prevent the catastrophic failure that would result from unloading the bearing at high speed. The features therefore compensate for changes in atmosphere, backpressure, temperature, etc. that would otherwise cause bearing assembly failure. In this regard, the features disclosed eliminate the need to manufacture individual components that separately address these shortcomings.

5. Example Valve

Returning to FIG. 4, the valve assembly 500 can be used to regulate the amount of air flowing into and out of an envelope (such as outer envelope 210 and/or the inner envelope 310) at any given time during flight. The valve assembly 500 can regulate, direct or control the flow of air by opening, closing or partially obstructing various passageways. For example, the valve assembly 500 can be mounted to the compressor inlet 402 of an air compressor, such as the compressor assembly 400 described above. The bell-mouth-shaped opening 416 of the compressor inlet 402 can provide a structural connection of the valve assembly 500 to the broader altitude control system 320 and unmanned aerial vehicle. Instead of attachment to the compressor assembly 400 and the remainder of the altitude control system 320, the valve assembly 500 can also stand alone and may instead be attached to the bottom plate 214, the top plate 201, directly to the envelope, or some other part of an unmanned aerial vehicle, such as balloon 200, in order to allow for direct access into and out of the envelope. The features of the disclosed valve assembly 500 can allow for effective operation of the valve assembly at high altitudes and allows for the contents of the envelope to remain sealed within the envelope at extremely low air temperatures.

Figure 11:
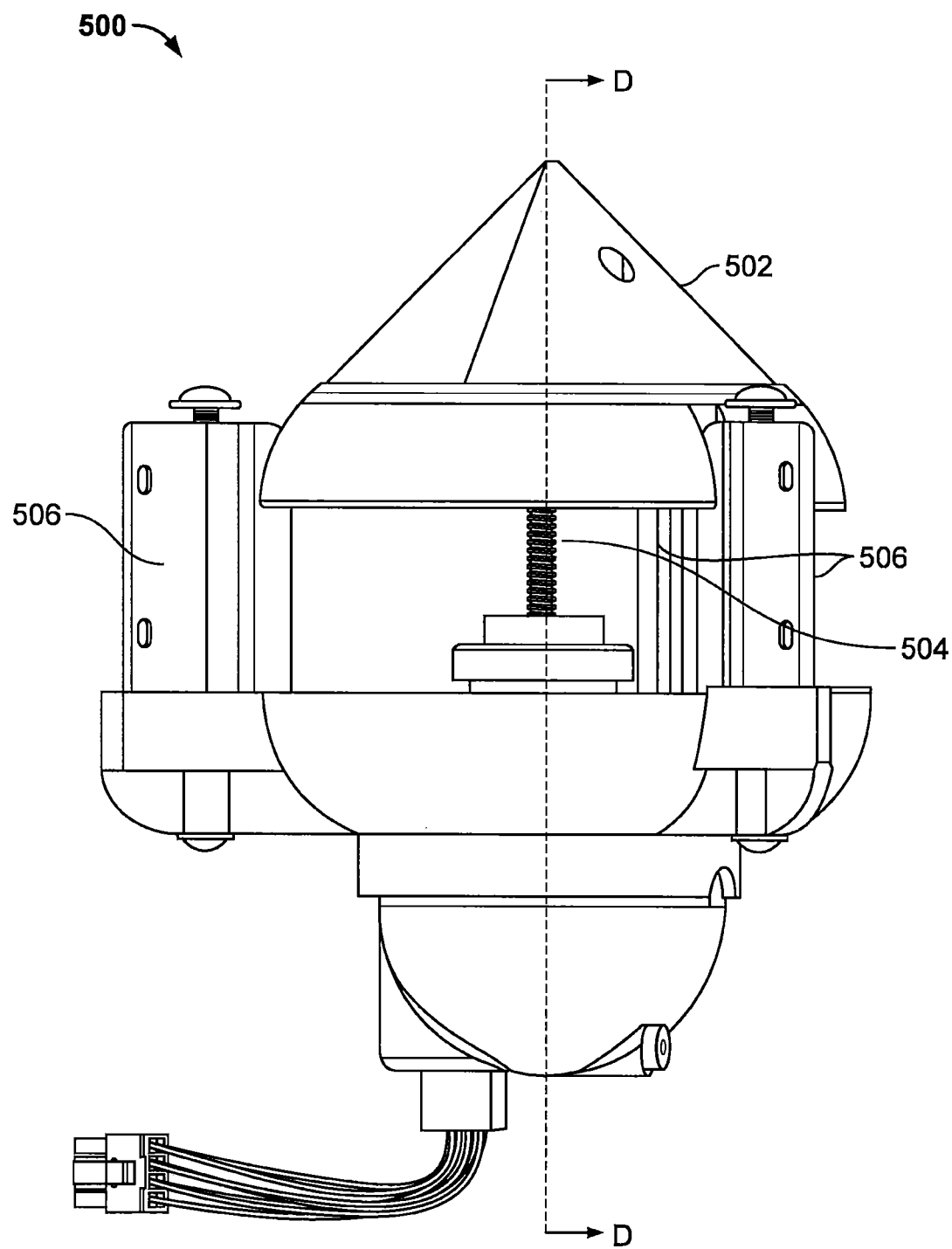
FIG. 11 is an example of a valve assembly of an example altitude control system according to aspects of the disclosure.

FIG. 11 illustrates a perspective view of the valve assembly 500. The valve assembly 500 can include several structural components, including a valve head 502, a driveshaft 504, mounting stanchions 506, motor mount 508, and a lower valve housing 510. The valve assembly 500 can be coupled to the inlet 503 of various types of assemblies including, for instance, the compressor assembly 400. The valve assembly can include several structural components, including a motor housing 518, driveshaft assembly 512 and motor coupler assembly 514.

Figure 12:
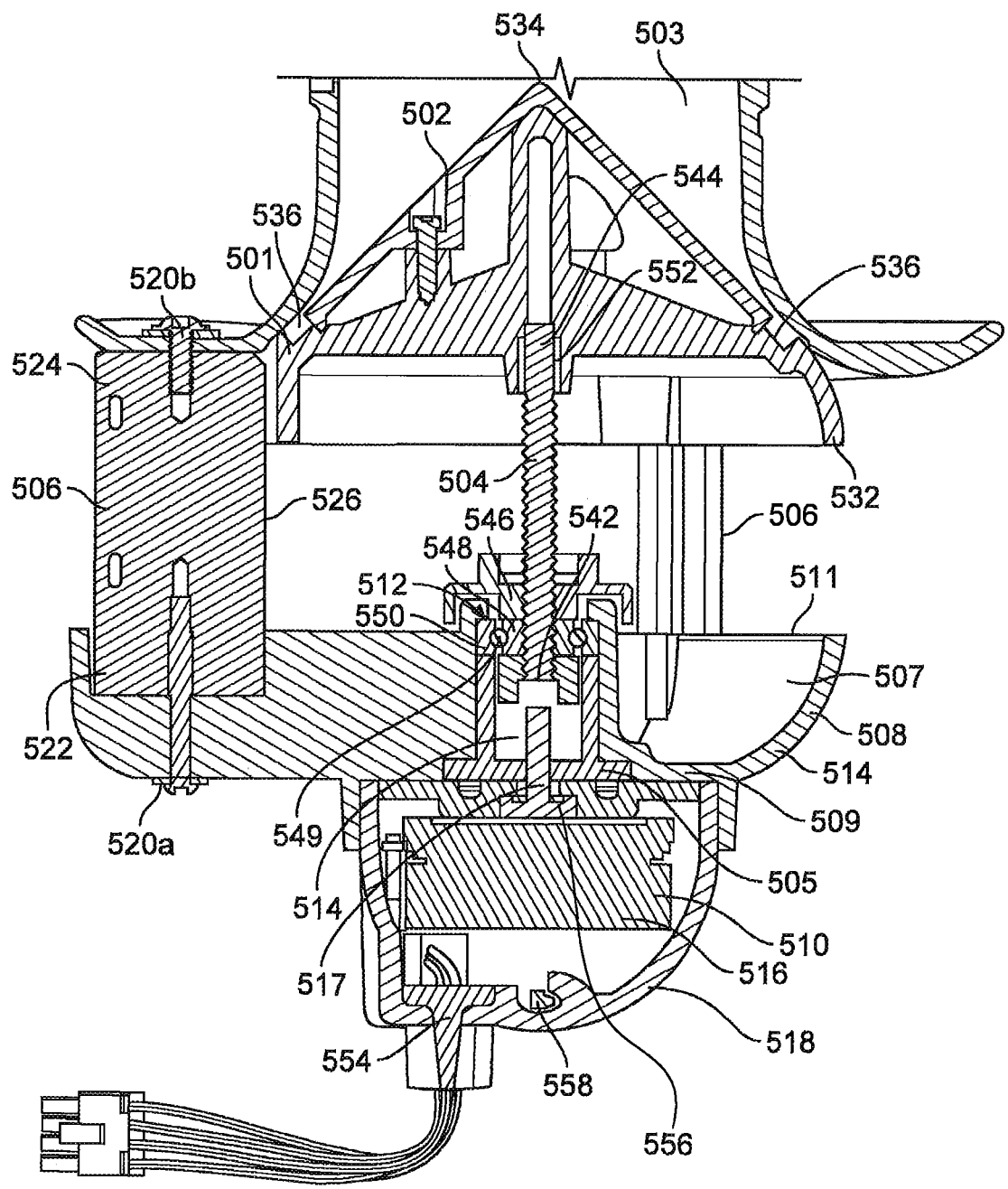
FIG. 12 is a cross-sectional view taken along the D-D of the example valve assembly of FIG. 11 disposed within an example inlet, according to aspects of the disclosure.

FIG. 12 is a cross-sectional view of the valve assembly, taken along line D-D of FIG. 11, but shown positioned within the inlet 503 of a device. The inlet 503 may be the same as the compressor inlet 402 of the compressor assembly 400, but in other examples, the inlet may be the inlet of a different compressor assembly, such as a centrifugal, an axial, or a different type of mixed flow processor. The inlet 503 can alternatively be a direct inlet to the balloon envelope (envelope 210 or the inner envelope 310) or another assembly altogether within or outside of ballooning technology. When used in connection with stratospheric balloons, the valve assembly 500 can be directly attached to the top plate, the bottom plate, or the balloon envelope.

The motor mount 508 can be the base housing structure to which the various components of the valve assembly 500 are mounted. The driveshaft assembly 512 and the driveshaft 504 to which the valve head 502 is mounted, as well as mounting stanchions 506 can be attached to an interior top surface of the motor mount 508. An exterior surface 509 of the motor housing 518, which is used to house the valve motor 516, can be attached to an outer lower surface of the motor mount 508.

Mounting stanchions 506 can be used to join the valve assembly to the compressor inlet 402. In one example, three evenly-spaced mounting stanchions 506 may extend around the perimeter of the motor mount 508. In other examples, less than three or more than three mounting stanchions may be utilized to join the valve assembly 500 to the compressor inlet 402. A first set of mounting screws 520a can be used to attach a first end 522 of each of the mounting stanchions 506 to the motor mount 508. A second end 524 of the mounting stanchions 506 can be joined by a second set of mounting screws 520b to the compressor inlet 402. Other fastening methods may also be used, including welding, heat staking, and adhesive bonding. A trailing edge 526 of each of the mounting stanchions 506 may be configured to function as a guide rail for the valve head 502.

The valve head 502 can be joined to an end of the driveshaft 504. In one example, the valve head 502 may be a conical-shaped device that includes a rounded bell-shaped base 532 that terminates in a tip 534. The valve head 502 may be sized so that at least portions of the valve head 502 fit within the compressor inlet 402. The conical shape of the valve head 502 further acts as a guide to redirect the contents of the envelope (such as outer envelope 210 and/or the inner envelope 310) away from the rest of the valve assembly 500 as the contents exits the envelope. Recesses within the valve head 502 may be configured to receive and cooperate with the edges 526 of the mounting stanchions 506 so as to travel in a vertical direction along the mounting stanchions 506, and to prevent rotation of the valve head 502 about the driveshaft 504.

The valve head 502 can be configured to increase or decrease the circumferential area of the compressor inlet 402 through which air can travel to or from the compressor inlet 402 and the attached envelope. As shown in FIG. 12, a cross-sectional view of FIG. 11 taken through line D-D, when the valve head 502 is fully extended, at least a portion of the valve head 502 is positioned within the compressor inlet 402, so as to close off the area of the opening 416 at the compressor inlet 402. The valve head 502 can also be retracted away from the compressor inlet 402 so as to increase the area of the opening 416 provided at the compressor inlet 402 from partially open to completely open. The valve head 502 can be moved from the fully extended position to the fully retracted position, as well as any position therebetween. The edges 526 of the mounting stanchions can guide the valve head 502 as the valve head moves axially toward and away from the compressor inlet 402. The valve head 502 can throttle the flow of air, so as to increase or decrease the amount of air into and out of the compressor inlet 402.

Figure 13:
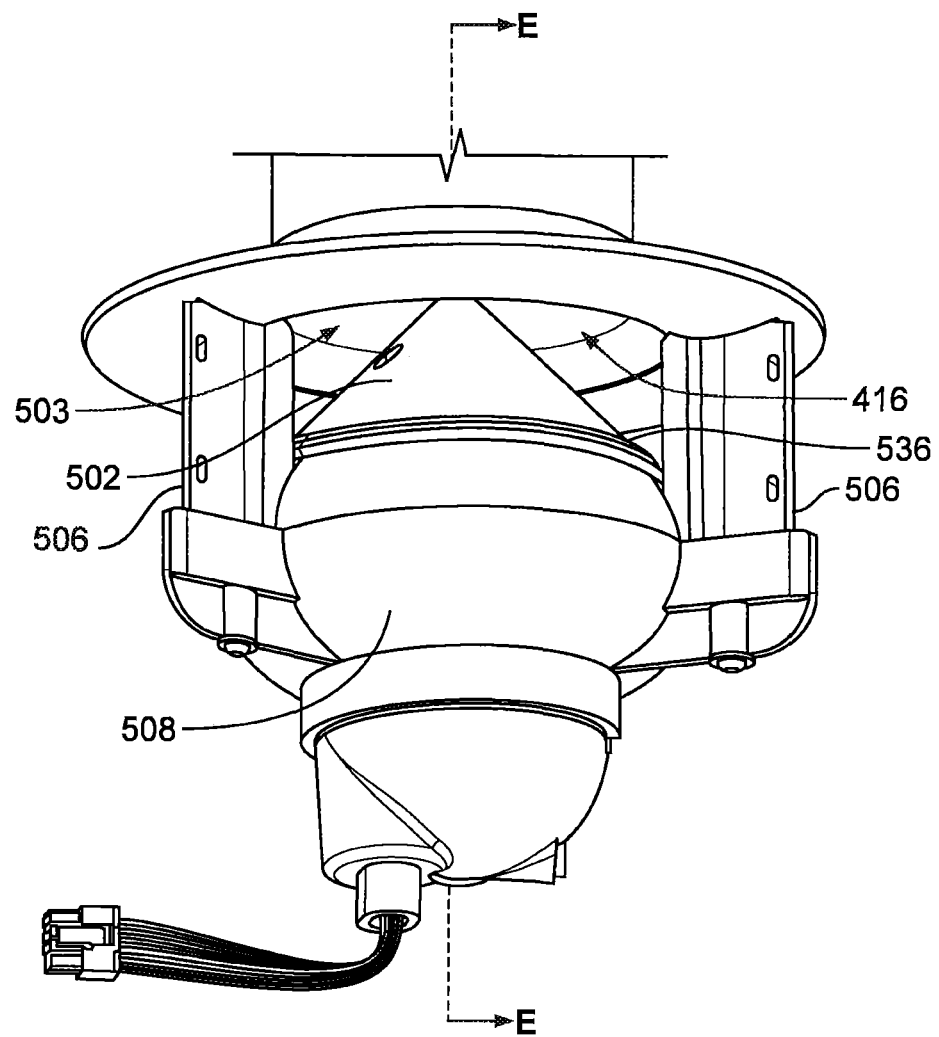
FIG. 13 is a view of the example valve assembly in a closed position.
Figure 13A:
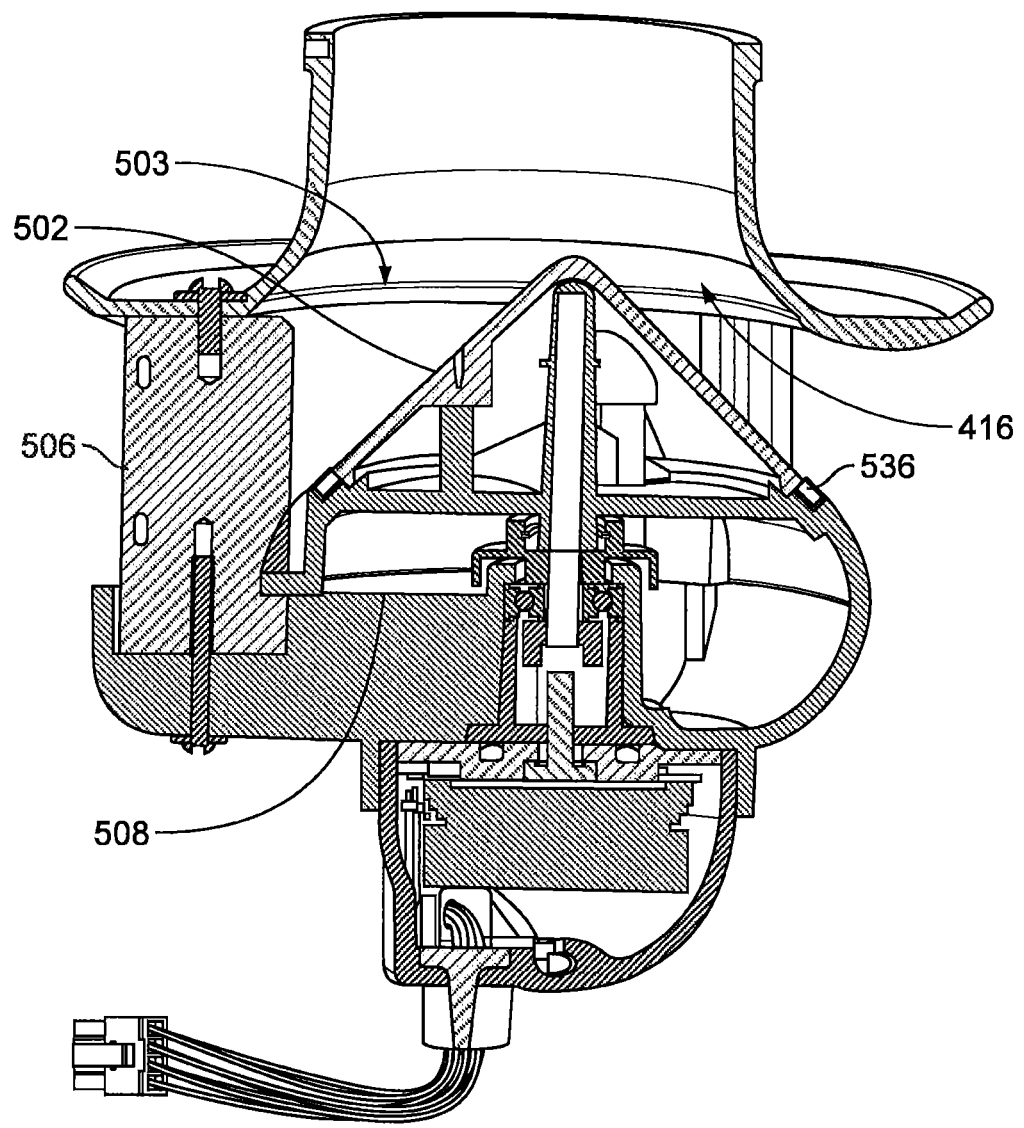
FIG. 13A is a cross-sectional view of the example valve assembly disposed within an example inlet taken along cross line E-E of FIG. 13.

FIG. 13 illustrates the valve heard 502 in a fully retracted position beneath the inlet 503. The valve head 502 is shown fully withdrawn from the compressor inlet 402. When fully retracted, the valve head 502 can be positioned adjacent the top surface 511 (depicted in FIG. 12) of the motor mount 508, such that the interior surface 507 of the motor mount 508 is no longer exposed and the driveshaft 504 and driveshaft assembly 512 are not visible. In the retracted position, air exiting the compressor inlet 402 will be directed away from the compressor inlet 402 and around the valve head 502.

Figure 14:
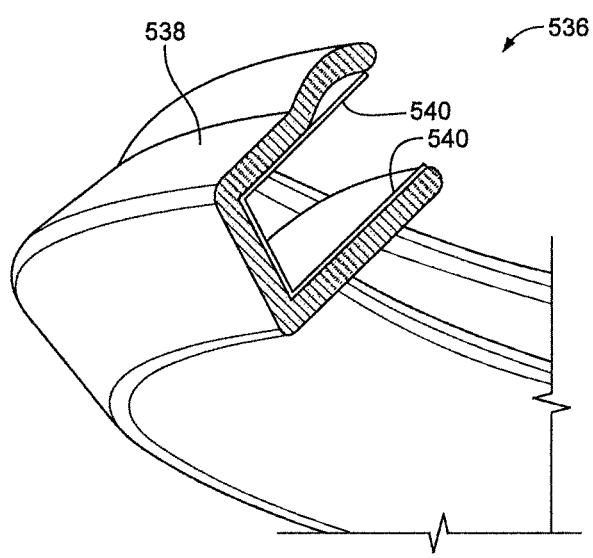
FIG. 14 is an example seal of the example valve assembly according to aspects of the disclosure.

When the valve head 502 is in its fully extended position, a seal can be used to seal the compressor inlet closed so as to maintain air within the envelope (such as outer envelope 210 and/or the inner envelope 310). In one example, a seal 536 is positioned within a recess 501 in the valve head 502 that extends around the outer circumference of the valve head 502. FIG. 14 illustrates an enlarged cross-sectional view of the seal 536.

The seal 536 may be comprised of a jacket partially enclosing a biasing mechanism. For example, a jacket 538 forms a general U-shape and may be sized to fit within the recess. The jacket 538 may be comprised of any variety of sealing materials, such as Polytetrafluoroethylene (PTFE), Polyether ether ketone (PEEK), Polyethylene, fluorosilicone and the like. The jacket 538 may be energized by a biasing mechanism, such as a spring 540. In this regard, the seal 536 may be an energized seal.

The spring 540 can be a U-shaped spring, but any variety of springs can be alternatively used, such as a coil spring, finger spring, or the like. The material comprising the jacket 538 can be held in place by the spring 540, causing the jacket 538 to seal across an extremely wide range of temperatures, surface imperfections, and other conditions. In other examples, other types of seals may be used, such as an O-ring, gasket or the like, as well as other materials used to form the seal.

A driveshaft coupled to the valve head 502 can be configured to drive the valve head 502 into and out of the compressor inlet 402. In one example, the driveshaft may be a ball screw or lead screw shaft that is configured to translate rotary motion into linear motion. FIG. 12 illustrates the driveshaft 504, along with example components of the valve assembly that can facilitate movement of the driveshaft 504 and valve head 502. A driveshaft housing 505 can be attached to the interior surface 507 of the motor mount 508 and overlie the valve motor 516. The valve motor may be attached to the exterior surface 509 of the motor mount 508. A motor shaft 517 extends upwardly from the valve motor 516 and motor housing 518 and through an opening in the motor mount 508 so that the motor shaft 517 extends into the driveshaft housing 505 and is aligned with the driveshaft 504. The motor shaft 517 can be coupled to a first end 542 of the driveshaft 504 by the motor coupler assembly 514. The motor coupler assembly 514 can be positioned within the driveshaft housing 505.

The driveshaft 504 can be secured within the driveshaft housing 505 and to the motor mount 508 by a series of jam nuts 546. The jam nuts may pinch the driveshaft 504 into place within the first inner race 548 of the driveshaft assembly 512. In one example, the jam nuts 546 can be a series of conical spring washers on the front which act as a soft stop as well as to prevent over travel and jamming of the valve head 502 as the valve head moves back and forth along the driveshaft.

A second end of the driveshaft 544, opposite of the first end, can be connected to the valve head 502. The valve head 502 may be driven along the driveshaft 504 by a captive nut 552, which may be, for example, heat staked, ultrasonically welded, or otherwise fastened into the center of the valve head 502, causing the assembly to move axially as the driveshaft 544 rotates.

The valve motor 516 and motor housing 518 can attach to the exterior of the motor mount. The valve motor 516 can be held in place by a series of secondary motor housings, with a gas/fluid seal on the shaft of the valve motor sealing the valve motor into a separate compartment. The valve motor may be of any variety with sufficient torque and speed to drive the system; the motor may be a brushless DC, brushed DC, or stepper motor so long as the valve motor is paired with a suitable controller to operate it.

The valve motor 516 can cause rotation of the driveshaft 504 and movement of the valve head 502 into and away from the compressor inlet 402. As the valve motor 516 rotates the driveshaft 504, the drive nut may be rotated, and the captive nut 552, along with the valve head 502, may move along the shaft linearly.

The driveshaft assembly 512 can facilitate rotational movement of the driveshaft 504. The driveshaft assembly 512 may overlie the driveshaft housing and be positioned around the driveshaft 504 and adjacent the base of the driveshaft 504 to facilitate rotational movement of the driveshaft 504. In one example, the driveshaft assembly 512 can be a ball bearing assembly that includes a first inner race 548 adjacent the driveshaft 544 and a second outer race 550 spaced away from the first inner race 548 by ball bearings 549. The driveshaft assembly 512 can be held in place between a jam nut 546, which threads onto the driveshaft 504 and overlying the driveshaft assembly 512, and the motor coupler assembly 514.

The motor coupler assembly 514 can extend around both the motor shaft 517 and first end 542 of the driveshaft 504. For example, the motor coupler assembly 514 can couple the first end 542 of the driveshaft 504 to the motor shaft 517. The motor coupler assembly 514 can be selected that will compensate for coefficient of thermal expansion ("CTE") mismatches within the valve assembly 500 as well as axial misalignment between the motor shaft 517 and the driveshaft 504.

The valve head 502 can be used to seal the compressor inlet. For example, in the fully extended position (shown in FIG. 12), the valve head 502 and the seal can be pressed up and into the air compressor inlet. The valve head 502 can maintain the volume of gas or fluid contents of the envelope (such as outer envelope 210 and/or the inner envelope 310) when the compressor inlet 402 is sealed. As the valve head 502 moves into the retracted position away from the compressor inlet 402, the seal 536 between the compressor inlet 402 and valve head 502 is broken, allowing the fluid contents of the envelope to escape to the external environment of the unmanned aerial vehicle.

The valve assembly disclosed herein may be used in connection with a wide variety of applications. As noted above, the valve assembly can be used with a compressor assembly, including, for example, the mixed compressor assembly 400, as described above. The valve assembly can be similarly used with traditional centrifugal or axial compressor assemblies and modifications thereof. In this regard, the valve assembly may be used in connection with a wide variety of applications, including unmanned aerial vehicles, but may also be used in connection with any technology that can utilize a valve assembly.

Instead of being coupled directly to an air compressor, the valve assembly 500 may alternatively be attached to the bottom or top plate and cooperate directly with the respective bottom or top plate attached to the envelope. The valve assembly 500 can also be attached to any desired part of the balloon envelope, including direct attachment to the outer envelope or the inner envelope. Similarly, the valve assembly 500 may be directly or indirectly attached to the balloon envelope (such as outer envelope 210 and/or the inner envelope 310). Further, multiple valve assemblies can also be used at the same time in connection with an unmanned aerial vehicle or other systems.

Thus, the features of the valve assembly disclosed herein provide for a configuration that allows for an effective structure to control the size of the circumferential opening of the inlet to which the valve assembly is attached, and ultimately to determine how much gas or fluid is allowed into and out of the envelope. In this regard, the features of the disclosed valve assembly may allow for the contents of the envelope to remain sealed at extremely low air temperatures, such as those encountered in the stratosphere, or for the envelope to be unsealed for either the addition or removal of ballast gas (e.g. air). Additionally, the valve assembly can be used to seal in gas within other systems and may be particularly useful in low temperature conditions.

6. Example Electronics Control Assembly

The altitude or direction of an unmanned aerial vehicle, such as balloon 200, may be determined and controlled by an electronics control assembly 600 that can cause the unmanned aerial vehicle to adjust its altitude to an altitude corresponding with a predetermined heading. The electronics control assembly for the altitude control system can be mounted at the top of the compressor of the altitude control system. For example, an electronics control assembly 600 can be mounted to a top of the compressor assembly 400 of the altitude control system 320, as shown in FIG. 4.

Figure 15:
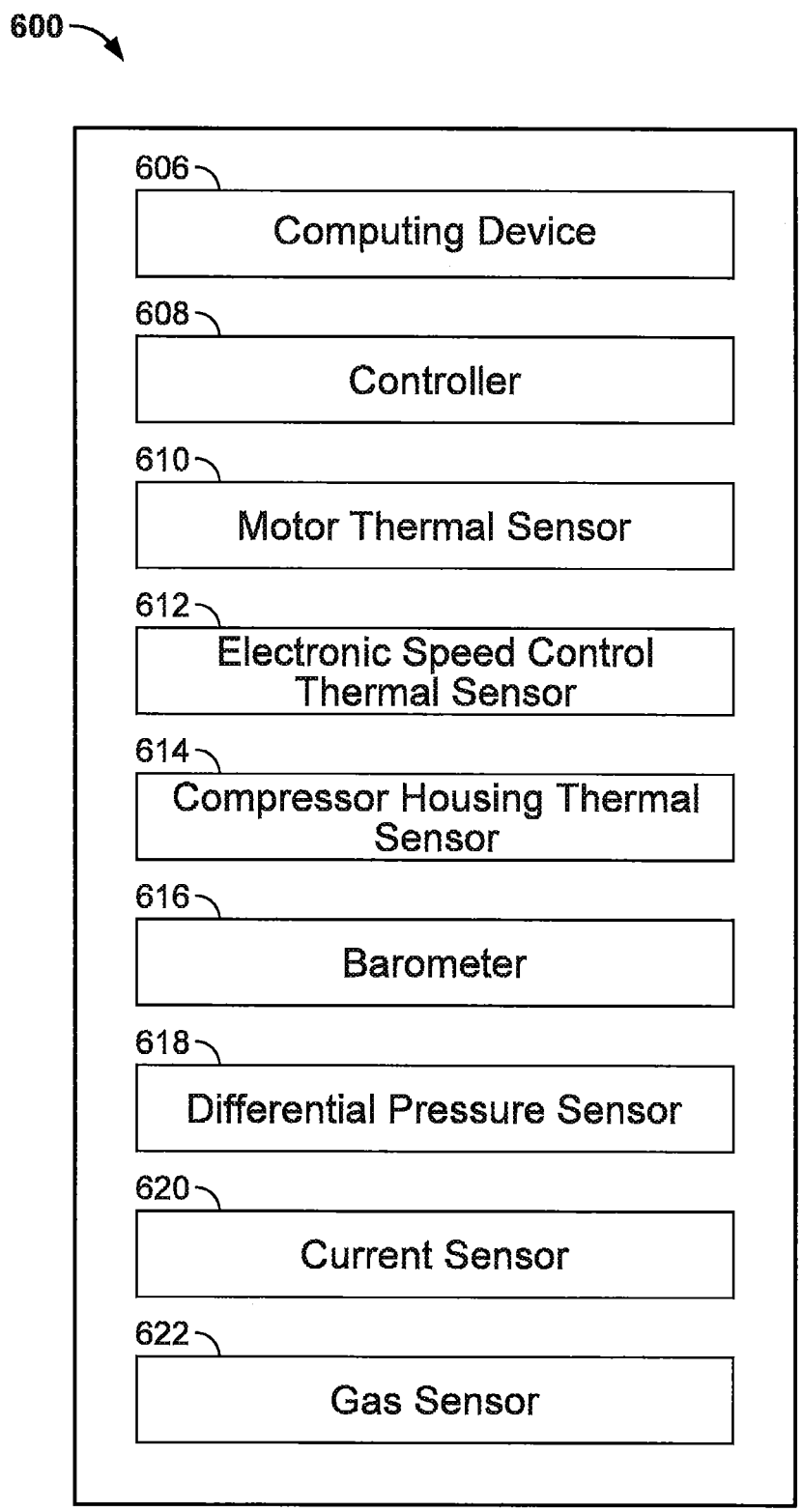
FIG. 15 is an example control electronic assembly according to aspects of the disclosure.

FIG. 15 schematically illustrates example components of the electronics control assembly 600. The electronics control assembly 300 can include a computing device 606 and/or a controller 608 that can control the altitude control system 320. As an example, the computing device and/or controller may include one or more processors and memory storing data and instructions in order to enable the electronics control assembly to perform the various functions described herein.

The electronics control assembly 600 can also include various sensors that provide data to the computing device 606 that the computing device 606 will use in making determinations regarding control of the altitude control system 320. For example, the control assembly can include a motor thermal sensor 610, an electronic speed control thermal sensor 612, a compressor housing thermal sensor 614, a barometer 616, a differential pressure sensor 618, a current sensor 620, and a gas sensor 622. The motor thermal sensor 610 may be configured to determine the temperature of the motor housing 518 of the valve assembly 500, the electronic speed control thermal sensor 612 can be configured to determine the temperature of the electronic speed control circuit controlling the valve motor 516, the compressor housing thermal sensor 614 can be configured to determine the temperature of the compressor housing of the system, the barometer 616 can be configured to determine the ambient pressure of the surrounding atmosphere, and the differential pressure sensor 618 can be configured to compare the pressure between the surrounding atmosphere and the interior of the envelope (such as outer envelope 210 and/or the inner envelope 310). The electronic assembly can further include a printed circuit board assembly having processors and other circuit elements to control operation of the valve motor 516.

In one example, the computing device 660 may send a signal or data packet to the controller 608. The data packet may include the altitude corresponding with a heading or wind vector selected by the computing device 606. In response, the controller 608 may cause the unmanned aerial vehicle to adjust its altitude based on the predetermined flight path. For example, if the selected heading corresponds to an altitude that is lower than the current altitude of aerial vehicle, the computing device 606 can cause aerial vehicle to decrease its altitude. This can, for example, involve causing the valve to retract from the compressor inlet while the compressor assembly 400 drives air into the envelope (such as outer envelope 210 and/or the inner envelope 310), thereby increasing the overall density of the system and causing a decrease in altitude to a lower point of neutral buoyancy.

Likewise, if a heading is selected by the computing device 60 that corresponds to an altitude that is higher than the current altitude of aerial vehicle, the computing device can cause the aerial vehicle to increase its altitude. For example, the valve head 502 of the valve assembly 500 may be opened to vent some or all of the contents (e.g. air and/or lift gas depending upon the envelope) of the envelope (which may be either the outer envelope 210 or the inner envelope 310), thereby causing the density of the system to decrease and the unmanned aerial vehicle to rise ensure that the envelope contents remain within the envelope.

Thus, the features of the disclosed electronic assembly allow for effective operation of the assemblies of the altitude control system, including the compressor assembly and the valve assembly.

7. Safety Features in View of Explosive Gasses

The altitude control system may be used in connection with an unmanned aerial vehicles that relies upon the use of air alone for lift or alternatively, with a vehicle that requires the use of explosive gases, such as lift gases in a stratospheric balloon. There is a need to implement safety features within altitude control systems that are used with explosive gases to both prevent and protect against the ignition of the explosive gases within either the outer or inner envelope. Such safety features can be implemented within one or more assemblies within the altitude control system, or within one or more assemblies that are used in connection with other types of systems where such assembly may be useful.

7a. Improved Safety Features for the Compressor

A compressor motor may require hundreds of watts to operate. In certain circumstances, such as those involving flammable gases, this may exceed the amount of power for the compressor to be considered intrinsically safe. Secondary and tertiary safety provisions may therefore be utilized to improve the operational safety of the device. Thus, the materials and structure of any type of compressor assembly, including the mixed flow assembly, can be modified to increase the ability of the compressor to withstand an explosion.

To prevent the electrical energy in the motor stator from shorting to ground or to another motor phase, slot liners for the various motor phase slots can be implemented and then the stator may be double varnished or otherwise improved in dielectric strength. The slot liners can be custom designed and/or commercially available or modified slot liners that can provide electrical insulation. Slot liners can also provide protection from electrical and mechanical stress. One example of a commercially available slot liner is Nomex®, but other commercially available slot liners may also be implemented.

Figure 16:
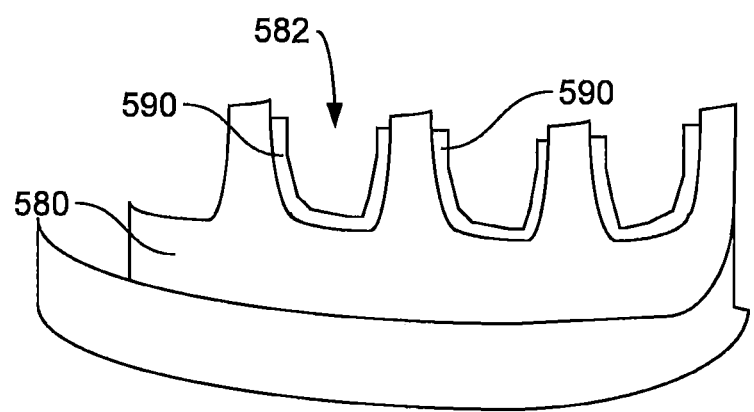
FIG. 16 is a schematic cross-sectional view showing slot liners according to an aspect of the disclosure.

In some examples, the double varnishing can be accomplished by providing two layers or applications of a varnish coating on the slot liners. Compared to a traditional single-varnished motor, this (coupled with the slot liner above) adds two additional dielectric barriers for secondary and tertiary fault tolerance and increases the overall dielectric strength of the system. A commercially available example of a suitable varnish is Dolphs! varnish, but other types of varnish may also be utilized. Alternatively, two layers of another dielectric coating or other dielectric fluid can be used. For example, the stator can be sprayed or dipped with powder coat or epoxy. As shown in FIG. 16, a cross-sectional view of a portion of the motor stator 580, slot liners 590 are positioned within opening 582 in the motor stator 580.

The materials selected to form the compressor can be selected from non-sparking materials. For example, brass or stainless steel are exemplary materials that can be used to form the compressor. Alternatively, when sparking materials are used within the compressor assembly, the sparking materials may be coated with an electrically-conductive conversion coating to inhibit sparking. For example, aluminum can be coated with an electrically-conductive conversion coating. Examples of commercially available conversion coating can include Alodine or SurTec 650.

Thus, these improved compressor safety features help to better regulate motor failure, as well as the possibility of sparking, which can cause combustion of the gases within the balloon.

7b. Improved Safety Features for the Valve Assembly

The valve assembly may be used in a wide variety of applications, including use within the altitude control system of an unmanned aerial vehicle. In certain circumstances, such as those involving flammable gases, the components of the valve assembly, including the drive motor, are prone to sparking that can cause the ignition of these gases.

To anticipate possible ignition of gases within the valve assembly, a toughened housing around the drive motor can be designed to specifically withstand explosion in the valve assembly. For example, FIG. 12 illustrates that the valve motor 516 may be enclosed within the lower valve housing 510. The lower valve housing 510 may be manufactured to be explosion proof and have a reinforced structure. Should the motor cause a spark in the presence of explosive lift gas, the resulting explosion can be contained within the lower valve housing 510.

The strength required for the lower valve housing 510 to withstand an explosion can be calculated. Based on the free volume within the lower valve housing 510, if the explosive stoichiometric gas mixture is present in the explosion proof housing, the resulting pressure may be obtained. In this manner, the explosion proof lower valve housing may be configured to withstand explosion with a safety factor of, e.g., 3.

Several additional features may also be included in the lower valve housing 510 design. Explosion proof seals on every penetration of the valve housing can be utilized. For example, the cable pass through 554 can be strengthened and a shaft seal 556 can be provided on the driveshaft of the valve mechanism. A small vent 558 may be left with a flame-arresting feature which allows the system to "breathe," but prevents a flame from exiting and causing an external ignition by quenching or arresting the flame as before the flame is able to exit the housing. For example, a high-aspect ratio drywall screw may be provided within the vent to arrest and/or quench the flame.

Thus, by containing possible failure and/or explosions to the lower valve housing 510, as an alternative to or in addition to enhancing other features within the altitude control assembly, safety features are provided that can protect the altitude control assembly from complete failure.

7c. Improved Safety Features for the Electronics Control Assembly

The electronics of the electronics control assembly 600, like the compressor motor 406, may require hundreds of watts to operate. In certain circumstances, such as those involving flammable gases, this may exceed the amount of power for the electronic assembly to be considered intrinsically safe. Secondary and tertiary safety provisions may therefore be utilized so that the electronics control assembly to be operationally safe.

A thermal/environmental housing around the circuit boards of the electronics control assembly 600 can be used to seal off the local air environment. This can help to prevent the explosive gas from direct exposure to energized traces and components on the circuit board. For example, the electronic assembly can be hermetically sealed.

Sensors configured to detect characteristics of the system that can lead to an explosion can also be implemented as a safety feature. For example, as shown in FIG. 16, current sensors 620 coupled to the circuit board can also be used to track the current that goes into and out of the three phases of each of the compressor and valve motors. If the amount of current going into and back out of the phases does not add up correctly, "leakage current" is detected, which is indicative of a possible future failure. For example, dielectric materials may be deteriorating, which can cause some of the current from a phase to "leak" to ground and potentially create a spark or short. Early detection of the leakage current even at extremely low levels, allows for the system to be shut down long before failure of the motor 516 poses a safety risk.

Gas sensors can also be used to predict possible future failure. For example, a gas sensor 622 which monitors for the presence of explosive gases, such as hydrogen, may be used to verify that the local gas combination is or is not an explosive one. When an explosive gas is detected, the gas sensor 622 can notify a user of the system that explosive gases are present and that the system should be shut down before the explosive gases can be caused to ignite. Alternatively, the gas sensor 622 can cause the system to be immediately shut down or shut down within a predetermined period.

Thus, the extra safeguards for the control electronics provide for another means for providing a safer altitude control system by attempting to seal the motor from being exposed to explosive gas, as well as providing means for early detection of events that may lead to motor failure and/or imminent explosion.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

What is claimed:

1. An altitude control system compressor assembly for an unmanned aerial vehicle comprising:
   a compressor housing;
   a motor housing disposed within a central cavity of the compressor housing;
   a motor disposed within the motor housing;
   an impeller, wherein the impeller overlies the motor housing such that the motor housing is positioned between the impeller and an inlet of the compressor housing; and
   wherein an interior surface of the compressor housing extends around the central cavity, and wherein the motor housing is spaced apart from the interior surface of the compressor housing and provides an air flow conduit around the motor housing that dissipates heat from the motor.

2. The system according to claim 1, wherein the compressor housing is a monolithic housing.

3. The system according to claim 1, further comprising an outer envelope configured to retain a lift gas therein and an inner envelope disposed within the outer envelope, the inner envelope being configured to retain ballast gas therein, wherein a compressor assembly regulates an amount of air within the inner envelope.

4. The system according to claim 1, further comprising an outer envelope configured to retain a ballast gas therein, and an inner envelope disposed within the outer envelope and configured to retain a lift gas therein, wherein a compressor assembly regulates an amount of air within the outer envelope.

5. The system according to claim 1, further comprising a valve assembly coupled to the inlet, the valve assembly being configured to regulate an amount of air entering into the entrance of the inlet.

6. The system of claim 1, further comprising:
   a compressor assembly comprising the compressor housing including a central cavity extending therethrough and joining an inlet to an outlet;
   a diffuser coupled to the compressor housing.

7. An altitude control system compressor assembly for an unmanned aerial vehicle comprising:
   a compressor housing comprised of a first material having a first coefficient of thermal expansion ("CTE");

a rotating shaft assembly positioned within the compressor housing and comprising:
a driveshaft comprised of a second material having a second CTE; and
an axially movable bearing carrier; and
a biasing element engaging the bearing carrier and configured to bias the bearing carrier toward the bearing assembly so as to preload the bearing assembly;
wherein the first material having a first CTE and the second material having a second CTE each expand and contract at different rates of thermal expansion due to temperature changes at altitude of the unmanned aerial vehicle.

8. The system according to claim 7, wherein when the biasing element is configured to bias the bearing carrier, the bearing carrier is configured to move the distal ring of the bearing assembly in an axial direction.

9. The system according to claim 7, wherein the bearing assembly further includes a plurality of ball bearings positioned between interior and distal races of the bearing assembly.

10. The system according to claim 7, wherein the compressor assembly further includes an inlet extending through a compressor assembly, the system further comprising a valve assembly coupled to the inlet, the valve assembly being configured to regulate air entering into the inlet.

11. An altitude control system compressor assembly for an unmanned aerial vehicle comprising:
a compressor housing comprised of a first material having a first coefficient of thermal expansion ("CTE");
a rotating driveshaft coupled to the compressor housing, the rotating driveshaft comprised of a second material having a second CTE;
a bearing assembly for the driveshaft; and
a preloading mechanism configured to dynamically compensate for differences in the first CTE and second CTE by changing a preloading force applied to the bearing assembly in response to temperature changes at altitude of the unmanned aerial vehicle.

12. The altitude control system compressor assembly for an unmanned aerial vehicle according to claim 11, wherein the preloading mechanism comprises:
a movable bearing carrier underlying the bearing assembly and movable along an axis parallel to the rotating driveshaft; and
a spring configured to bias the bearing carrier towards the bearing assembly.

13. The altitude control system compressor assembly for an unmanned aerial vehicle according to claim 12, wherein when the spring biases the bearing carrier to move a distal race of the bearing assembly.

14. An altitude control system compressor assembly for an unmanned aerial vehicle comprising:
an inlet opening to an interior portion of the unmanned aerial vehicle;
a diffuser above the inlet, the diffuser includes a passageway between an upper portion of the diffuser and a lower portion of the diffuser;
wherein the diffuser is configured to allow air to exit radially outward from the system; and
a valve constructed and arranged to move into and away from the inlet opening so as to vary a size of the inlet opening;
a driveshaft coupled to the valve head at a first end; and
wherein the valve is configured to move between a first fully extended position within the inlet opening and a second retracted position away from the inlet opening, and wherein when the valve is in the first fully extended position, the valve occupies an entirety of the inlet opening prohibiting free flow into and out of the inlet opening.

15. The altitude control system compressor assembly for an unmanned aerial vehicle according to claim 14, further comprising a motor assembly and a motor housing.

16. An altitude control system compressor assembly for an unmanned aerial vehicle as described in claim 14:
wherein the diffuser has a substantially planar configuration;
wherein the lower portion of the diffuser is curved and the upper portion of the diffuser is curved; and
wherein the passageway exhausts radially outward proximate to a perimeter of the lower portion and a perimeter of the upper portion.

17. An altitude control system compressor assembly for an unmanned aerial vehicle as described in claim 14, further comprising a motor including a linear passageway connected to the passageway in the diffuser, and wherein the passageway in the diffuser extends away from the linear passageway.

18. An altitude control system compressor assembly for an unmanned aerial vehicle as described in claim 14, wherein the shape of the diffuser has a generally planar configuration and is configured to distribute the air radially away from the system.

19. An altitude control system compressor assembly for an unmanned aerial vehicle as described in claim 14, further comprising:
a valve assembly coupled to the inlet opening including:
a valve configured to move into and away from the inlet opening so as to change a size of the circumferential area of the inlet opening;
a driveshaft coupled to the valve; and
a motor assembly coupled to a second end of the driveshaft, wherein the valve is configured to move between a first fully extended position within the inlet opening and a second retracted position away from the inlet opening, and wherein when the valve is in the first fully extended position, the valve is arranged to occupy an entire circumferential area of the inlet opening thereby prohibiting free flow of contents into and out of the inlet opening;
wherein the diffuser is configured to distribute air away from the system.

* * * * *